US012753924B2

(12) United States Patent
Janakiraman et al.

(10) Patent No.: US 12,753,924 B2
(45) Date of Patent: Oct. 6, 2026

(54) COATED COMPONENTS FOR COKE ABATEMENT IN GAS TURBINE ENGINES

(71) Applicant: General Electric Company, Evendale, OH (US)

(72) Inventors: Narayanan Janakiraman, Bengaluru (IN); Arundhati Sengupta, Bengaluru (IN); Karthick Gourishankar, Bengaluru (IN); Sanjay Kumar Sondhi, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 40 days.

(21) Appl. No.: 19/049,694

(22) Filed: Feb. 10, 2025

(65) Prior Publication Data

US 2026/0202060 A1 Jul. 16, 2026

(30) Foreign Application Priority Data

Nov. 11, 2024 (IN) ............................. 202411086768

(51) Int. Cl.

*F23R 3/40* (2006.01)
*F02C 7/22* (2006.01)
*F23R 3/34* (2006.01)

(52) U.S. Cl.

CPC ................ *F23R 3/40* (2013.01); *F02C 7/222* (2013.01); *F23R 3/343* (2013.01); *F05D 2230/31* (2013.01); *F05D 2300/141* (2013.01); *F05D 2300/143* (2013.01); *F05D 2300/609* (2013.01); *F05D 2300/611* (2013.01); *F23R 2900/00004* (2013.01)

(58) Field of Classification Search

CPC .. F23R 2900/00004; F23R 3/343; F23R 3/40; F02C 7/222; F05D 2230/31; F05D 2300/611; F05D 2300/609; F05D 2300/143; F05D 2300/141

See application file for complete search history.

(56) References Cited

U.S. PATENT DOCUMENTS

| | | |
|---|---|---|
| 3,092,558 A | 6/1963 | Hughes et al. |
| 4,500,602 A | 2/1985 | Patten et al. |

(Continued)

FOREIGN PATENT DOCUMENTS

| | | |
|---|---|---|
| CN | 110440294 A | 11/2019 |
| CN | 114657542 A | 6/2022 |

OTHER PUBLICATIONS

Du et al., "Phase diagram of Ag—Pb—Sn system," Calphad, vol. 71, p. 1-20 (2020).

(Continued)

*Primary Examiner* — Rodolphe Andre Chabreyrie
(74) *Attorney, Agent, or Firm* — Venable LLP; David D. Leege; Michele V. Frank

(57) ABSTRACT

A coated component for coke abatement in a gas turbine engine. The coated component includes a metal substrate defining, at least in part, a flow passage for a hydrocarbon fluid, and a nanophase separated catalytic coating deposited on the metal substrate to be exposed to the flow passage for abating coke formation from the hydrocarbon fluid. The nanophase separated catalytic coating includes a substantially pure transition metal phase, a substantially pure noble metal phase, and a substantially pure transition metal oxide phase.

20 Claims, 9 Drawing Sheets

(56) References Cited

U.S. PATENT DOCUMENTS

| | | | |
|---|---|---|---|
| 6,884,467 B2 | 4/2005 | Walker et al. | |
| 9,062,563 B2 | 6/2015 | Varanasi et al. | |
| 9,976,488 B2 | 5/2018 | Sokolov et al. | |
| 10,683,807 B2 | 6/2020 | McMasters et al. | |
| 11,242,800 B2 | 2/2022 | Jain et al. | |
| 11,794,382 B2 | 10/2023 | Britz | |
| 2006/0222846 A1 | 10/2006 | Ackerman et al. | |
| 2017/0267595 A1 | 9/2017 | Mazany | |
| 2019/0137104 A1* | 5/2019 | Jain | F02C 7/222 |
| 2023/0266012 A1 | 8/2023 | Kool et al. | |
| 2024/0157336 A1 | 5/2024 | Gourishankar et al. | |

OTHER PUBLICATIONS

Gulbransen et al., “The Kinetics of the Oxidation of Cobalt,” Journal of the Electrochemical Society, vol. 98, No. 6, p. 241-251 (1951).

Karakaya et al., “The Ag—Co (Silver-Cobalt) system,” Bulletin of Alloy Phase Diagrams, vol. 7, No. 3, p. 259-263 (1986).

Tobosque et al., “Synthesis and characterization of nanostructured Pb—Co—Sn film for the oxygen evolution reactior in sulfuric acid media,” Journal of Nanoparticle Research, 23(136), p. 1-11 (2021).

Xu et al., “The phase relationship in the Co—Pb—Sb ternary system at 500K,” Journal of Alloys and Compounds, vol. 415, Issues 1-2, p. 121-125 (2006).

* cited by examiner

COATED COMPONENTS FOR COKE ABATEMENT IN GAS TURBINE ENGINES

CROSS REFERENCE TO RELATED APPLICATIONS

The present application claims the benefit of Indian Patent Application No. 202411086768, filed on Nov. 11, 2024, which is hereby incorporated by reference herein in its entirety.

TECHNICAL FIELD

The present disclosure relates to coated components for coke abatement, for example, in gas turbine engines for aircraft.

BACKGROUND

Gas turbine engines include surfaces that contact hydrocarbon fluids, such as fuels and lubricating oils. Carbonaceous deposits (also known as coke) may form on these surfaces when exposed to the hydrocarbon fluids at elevated temperatures, resulting in carbon becoming attached to surfaces contacted by a fuel or oil and building up as deposits on those surfaces contacted by the fuel or the oil.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 3 is a detail view showing detail 3 in FIG. 2.

FIG. 4 is a detail view showing detail 4 in FIG. 3.

FIG. 6 is a detail view showing detail 6 in FIG. 5.

DETAILED DESCRIPTION

Figure 1:
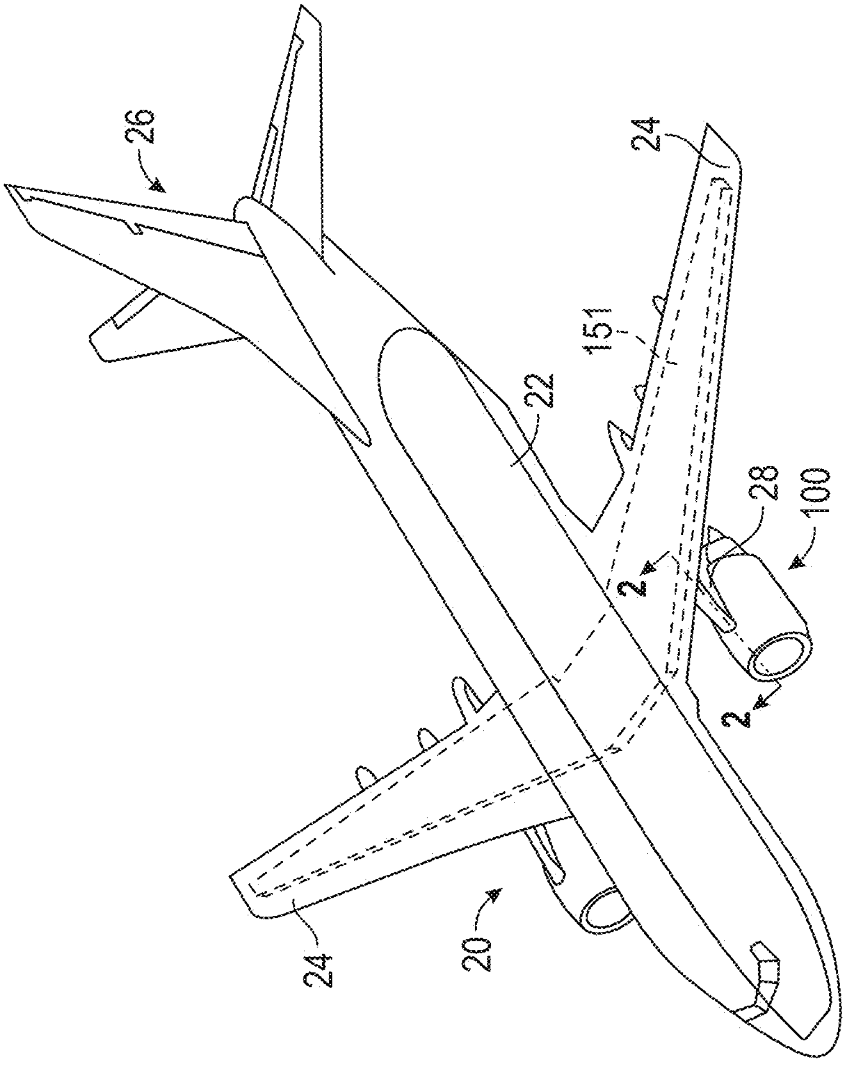
FIG. 1 is a schematic view of an aircraft having a gas turbine engine according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

The terms “forward” and “aft” refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows. The term “fluid” may be a gas or a liquid. The term “fluid communication” means that a fluid is capable of making the connection between the areas specified.

The terms “coupled,” “fixed,” “attached,” “connected,” and the like, refer to both direct coupling, fixing, attaching, or connecting as well as indirect coupling, fixing, attaching, or connecting through one or more intermediate components or features, unless otherwise specified herein.

The term “transition metal” refers to the elements of Groups 3 (IIIb) through 12 (IIb) of the periodic table and combinations thereof and excludes noble metals.

The term “noble metal” refers to the elements rhenium, ruthenium, rhodium, palladium, silver, osmium, iridium, platinum, and gold.

As used herein, a material is “nanophase separated” if the material has at least two phases, each of the at least two phases is contained in a plurality of regions of the material, and the plurality of regions of each phase has an average diameter ranging from one nanometer to one micron. In some embodiments, the plurality of regions are grains.

As used herein, a “substantially pure transition metal phase” includes at least one transition metal element and has at least ninety-five weight percent of transition metal elements by total weight of the substantially pure transition metal phase. In some embodiments, the substantially pure transition metal phase includes at least one transition metal element and has at least ninety-nine weight percent of transition metal elements by total weight of the substantially pure transition metal phase. In some embodiments, the substantially pure transition metal phase includes at least one transition metal element and has at least ninety-nine point nine (99.9) weight percent of transition metal elements of the substantially pure transition metal phase.

As used herein, a “substantially pure transition metal oxide phase” includes at least one transition metal oxide compound and has at least ninety-five weight percent of transition metal oxide compounds by total weight of the substantially pure transition metal oxide phase. In some embodiments, the substantially pure transition metal oxide phase includes at least one transition metal oxide compound and has at least ninety-nine weight percent of transition metal oxide compounds by total weight of the substantially pure transition metal oxide phase. In some embodiments, the substantially pure transition metal oxide phase includes at least one transition metal oxide compound and has at least ninety-nine point nine (99.9) weight percent of transition metal oxide compounds of the substantially pure transition metal oxide phase.

As used herein, a "substantially pure noble metal phase" includes at least one noble metal elements and has at least ninety-five weight percent of noble metal elements by total weight of the substantially pure noble metal phase. In some embodiments, the substantially pure noble metal phase includes at least one noble metal element and has at least ninety-nine weight percent of noble metal elements by total weight of the substantially pure noble metal phase. In some embodiments, the substantially pure noble metal phase includes at least one noble metal element and has at least ninety-nine point nine (99.9) weight percent of noble metal elements of the substantially pure noble metal phase.

As used herein, a first phase or compound is "substantially immiscible" with a second phase or compound if an equilibrium mixture (e.g., an alloy or a solid solution) of the first phase or compound and the second phase or compound cannot be formed at a temperature of two hundred seventy three point one five (273.15) Kelvin and an absolute pressure of exactly one hundred one point three two five (101.325) kPa having between five weight percent and ninety-five weight percent of the first compound by total weight of the equilibrium mixture.

As used herein, an alloy is "based" on a particular element when that element is present in the alloy at the greatest weight percent, by total weight of the alloy, of all elements contained in the alloy. For example, an iron-based alloy has a higher weight percentage of iron than any other single element present in the alloy.

As used herein, the average grain size of a material can be determined by, for example, X-ray diffraction (XRD) or scanning electron microscopy.

The singular forms "a," "an," and "the" include plural references unless the context clearly dictates otherwise.

Here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other.

As noted above, coke deposition may occur on surfaces of a gas turbine engine that are exposed to hydrocarbon fluids, such as fuels and lubricating oils, at elevated temperatures. The fuel nozzle and swirler (collectively, a mixer assembly) used in a combustor for a gas turbine engine includes such surfaces.

Coke can build up in fuel flow pathways in the nozzle, fuel orifices, swirler, or other locations prone to fuel flow blockage, or affecting the fluid dynamics or aerodynamics of fuel flow. Some of these hydrocarbon fluid flow pathways, such as these fuel flow pathways, may be susceptible to soak-back heating, which can lead to soak-back coking. Immediately after shutdown, soak-back heating occurs. At shutdown, the flow of a hydrocarbon fluids, such as fuel, within a fuel flow pathway and against and interior surface defining the pathway can be stagnated (or at least greatly reduced). In addition, various cooling fluids, such as cooling air, are not flowing to cool the gas turbine engine. At the same time, components such as the fuel nozzle or surrounding portions, of the combustor are still hot. Accordingly, both the temperature of the hydrocarbon fluid (e.g., fuel) and the wall defining the hydrocarbon fluid flow pathways increase to temperatures above a coke formation temperature. At these temperatures, the interior surface, which is exposed to the hydrocarbon fluid and made from the metals discussed herein, may be susceptible to a significant build-up of coke. Under such conditions, coke can build up over time to a considerable thickness, restricting or even blocking the flow of the hydrocarbon fluid through the hydrocarbon fluid flow pathways.

A nanophase separated catalytic coating can be positioned to mitigate this soak-back coking, and coke deposits can be reduced or eliminated using the nanophase separated catalytic coating capable of catalyzing a degradation reaction of coke such as, for example, coke oxidation. For example, coke oxidation may convert solid coke deposits to gaseous reaction products because coke oxidation may include the reaction of carbon with diatomic oxygen to form reaction products such as carbon monoxide and carbon dioxide. Without a nanophase separated catalytic coating capable of catalyzing a degradation reaction of coke, coke may build up on a surface and degrade the performance of systems and components. For example, the nanophase separated catalytic coating may reduce coking at low temperatures (e.g., from three hundred degrees Fahrenheit to five hundred degrees Fahrenheit), as discussed below, and may be useful for reducing coking on fuel nozzles and valves as described in more detail below.

Disclosed herein is a nanophase separated catalytic coating that can be applied to various surfaces and components to reduce the buildup of coke thereon. The nanophase separated catalytic coating includes a substantially pure transition metal phase, a substantially pure noble metal phase, and a substantially pure transition metal oxide phase such that the nanophase separated catalytic coating is catalytically active.

Without wishing to be bound by theory, the inventors believe that the transition metal oxide phase can provide oxygen vacancy defects for better surface oxygen availability (both in terms of concentration and mobility). The noble metal phase can provide faster pathways for electrons to help with fast charge-transfer kinetics. The transition metal phase can be interspersed with the noble metal phase to increase the number of interphase boundaries with the noble metal phase when oxidized, which may help enhance reaction kinetics. The transition metal phase can also help to replenish the transition metal oxide phase with the transition metal oxide on an outer surface of the coating in case of loss of transition metal oxide. The noble metal and transition metal phases together can help achieve good adherence with the metallic substrate, and can enhance the durability of the whole coating.

Grain sizes of the substantially pure transition metal phase, the substantially pure noble metal phase, and the substantially pure transition metal oxide phase can be tailored to improve, for example, catalytic activity of the nanophase separated catalytic coating when the nanophase separated catalytic coating is applied to a metal substrate such as a surface or a portion of a component. Decreasing grain size can increase the reactivity of the nanophase separated catalytic coating by, for example, increasing available catalytic surface area of the catalytic coating for contacting coke and for catalyzing coke degradation.

The nanophase separated catalytic coating is a metallic coating. The phase separated catalytic coating can have an improved durability due to a metallic strength of the nanophase separated catalytic coating, metallurgical bonding of the nanophase separated catalytic coating to a metal substrate, and a favorable coefficient of thermal expansion match between the nanophase separated catalytic coating and the metal substrate. The catalytic activity of the nanophase separated catalytic coating can be regenerated after use of the nanophase separated catalytic coating by oxidizing the nanophase separated catalytic coating to regenerate the substantially pure transition metal oxide phase. For example, in case of loss of transition metal oxide, the substantially pure transition metal oxide phase can be replenished with transition metal oxide by oxidizing transition metal elements in the substantially pure transition metal phase. Some non-limiting examples of suitable surfaces and components include aircraft components, gas turbine engine components, including lube oil system components, and fuel system components.

Fuel system components can include fuel circuit components, fuel nozzles (e.g., fuel flow passages and fuel injection orifices), mixer assembly components (e.g., a venturi surface on the fuel nozzle, the fuel nozzle tip, or combinations thereof), and portions and combinations thereof. The gas turbine may be a gas turbine for an aircraft or may be a terrestrial turbine such as for a power plant, or a nautical gas turbine engine for a ship. Some such components are described in more detail below.

FIG. 1 shows an aircraft 20 that may implement various embodiments. The aircraft 20 includes a fuselage 22, wings 24 attached to the fuselage 22, and an empennage 26. The aircraft 20 also includes a propulsion system that produces a propulsive thrust required to propel the aircraft 20 in flight, during taxiing operations, and the like. The propulsion system for the aircraft 20 shown in FIG. 2 includes a pair of engines 100. In this embodiment, each engine 100 is attached to one of the wings 24 by a pylon 28 in an under-wing configuration. Although the engines 100 are shown attached to the wing 24 in an under-wing configuration in FIG. 2, in other embodiments, the engine 100 may have alternative configurations and be coupled to other portions of the aircraft 20. For example, the engine 100 may additionally or alternatively include one or more aspects coupled to other parts of the aircraft 20, such as, for example, the empennage 26, and the fuselage 22.

Figure 2:
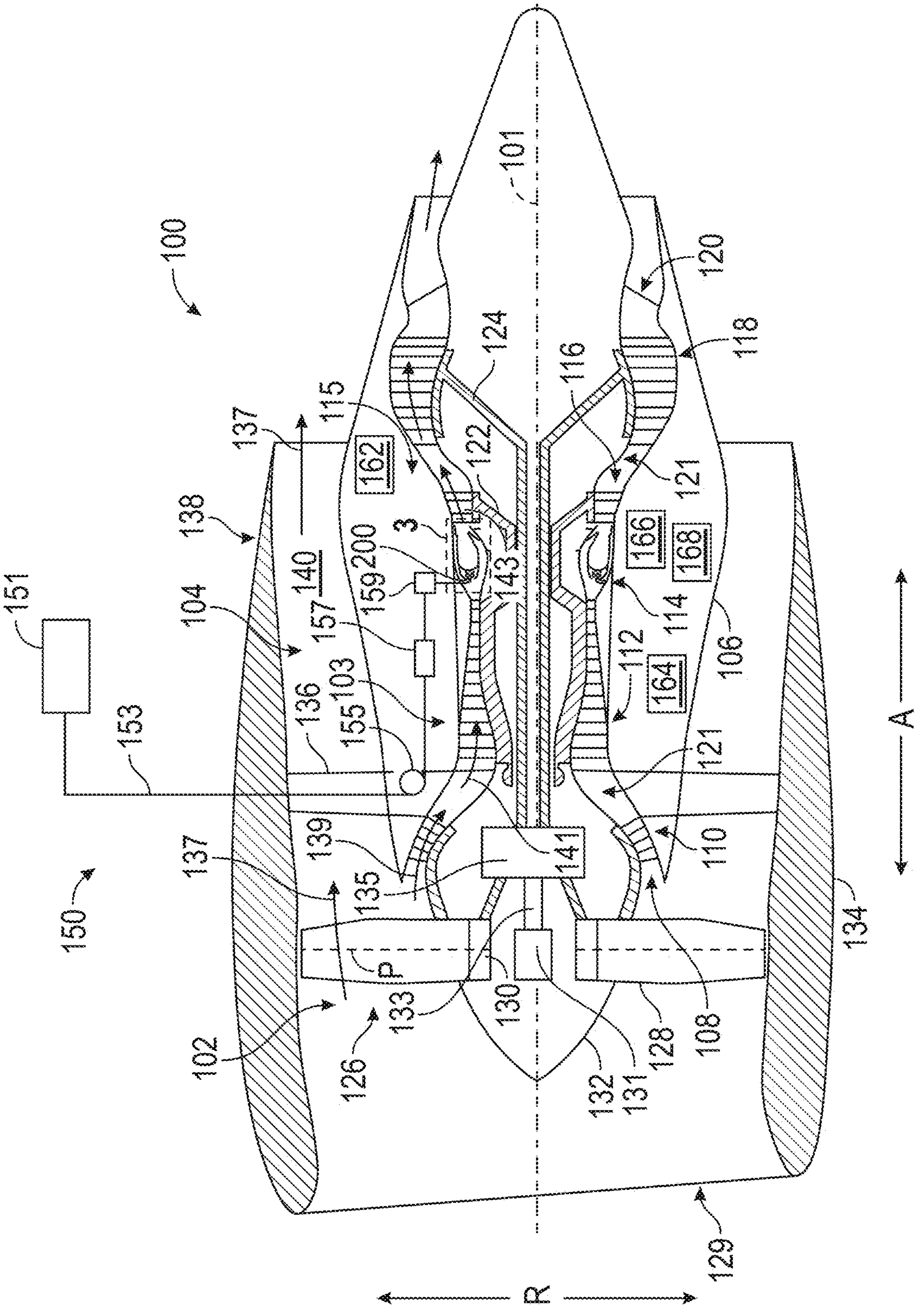
FIG. 2 is a cross-sectional view taken along line 2-2 in FIG. 1, of the gas turbine engine of the aircraft shown in FIG. 2.

As will be described further below, with reference to FIG. 2, the engines 100 shown in FIG. 1 are gas turbine engines that are each capable of selectively generating a propulsive thrust for the aircraft 20. The amount of propulsive thrust may be controlled at least in part based on a volume of fuel provided to the engine 100 (e.g., a gas turbine engine) via a fuel system 150 (see FIG. 3). An aviation turbine fuel in the embodiments discussed herein is a combustible hydrocarbon liquid fuel, such as a kerosene-type fuel, having a desired carbon number, a synthetic aviation fuel, a biofuel, a biodiesel, an ethanol, a bioalcohol, and the like. The fuel is stored in a fuel tank 151 of the fuel system 150. As shown in FIG. 2, at least a portion of the fuel tank 151 is located in each wing 24 and a portion of the fuel tank 151 is located in the fuselage 22 between the wings 24. The fuel tank 151, however, may be located at other suitable locations in the fuselage 22 or the wing 24. The fuel tank 151 may also be located entirely within the fuselage 22 or the wing 24. The fuel tank 151 may also be separate tanks instead of a single, unitary body, such as, for example, two tanks each located within a corresponding wing 24.

Although the aircraft 20 shown in FIG. 1 is an airplane, the embodiments described herein may also be applicable to other aircraft 20, including, for example, helicopters and unmanned aerial vehicles (UAV). The aircraft discussed herein are fixed-wing aircraft or rotor aircraft that generate lift by aerodynamic forces acting on, for example, a fixed wing (e.g., the wing 24) or a rotary wing (e.g., a rotor of a helicopter), and are heavier-than-air aircraft, as opposed to lighter-than-air aircraft (such as a dirigible). Further, although not depicted herein, in other embodiments, the gas turbine engine may be any other suitable type of gas turbine engine, such as an industrial gas turbine engine incorporated into a power generation system, a nautical gas turbine engine, etc.

FIG. 2 is a schematic, cross-sectional view of one of the engines 100 used in the propulsion system for the aircraft 20 shown in FIG. 1. The cross-sectional view of FIG. 2 is taken along line 2-2 in FIG. 1. For the embodiment depicted in FIG. 2, the engine 100 is a high bypass engine. The engine 100 has an axial direction A (extending parallel to a longitudinal centerline axis 101, shown for reference in FIG. 2), a radial direction R, and a circumferential direction. The circumferential direction (not depicted in FIG. 2) extends in a direction rotating about the axial direction A. The engine 100 includes a fan section 102 and a turbo-engine 104 disposed downstream from the fan section 102.

The turbo-engine 104 depicted in FIG. 2 includes, in serial flow relationship, a compressor section 103, a combustion section 114, and a turbine section 115. The turbo-engine 104 is substantially enclosed within an outer casing 106 that is substantially tubular and defines a core inlet 108. The core inlet 108 is annular in the depicted embodiment. As schematically shown in FIG. 2, the compressor section 103 includes a booster or a low pressure (LP) compressor 110 followed downstream by a high pressure (HP) compressor 112. The combustion section 114 is downstream of the compressor section 103. The turbine section 115 is downstream of the combustion section 114 and includes a high pressure (HP) turbine 116 followed downstream by a low pressure (LP) turbine 118. The turbo-engine 104 further includes a jet exhaust nozzle section 120 that is downstream of the turbine section 115, a high-pressure (HP) shaft 122 or a spool, and a low-pressure (LP) shaft 124. The HP shaft 122 drivingly connects the HP turbine 116 to the HP compressor 112. The HP turbine 116 and the HP compressor 112 rotate in unison through the HP shaft 122. The LP shaft 124 drivingly connects the LP turbine 118 to the LP compressor 110. The LP turbine 118 and the LP compressor 110 rotate in unison through the LP shaft 124. The compressor section 103, the combustion section 114, the turbine section 115, and the jet exhaust nozzle section 120 together define a core air flow path 121 through which core air 139 flows.

The fan section 102 shown in FIG. 2 includes a fan 126 (e.g., a variable pitch fan) having a plurality of fan blades 128 coupled to a disk 130 in a spaced apart manner. As depicted in FIG. 2, the fan blades 128 extend outwardly from the disk 130 generally along the radial direction R. In the case of a variable pitch fan, the plurality of fan blades 128 are rotatable relative to the disk 130 about a pitch axis P by virtue of the fan blades 128 being operatively coupled to an actuation member 131 configured to collectively vary the pitch of the fan blades 128 in unison. The fan blades 128, the disk 130, and the actuation member 131 are together rotatable about the longitudinal centerline axis 101 via a fan shaft 133 that is powered by the LP shaft 124 across a power gearbox, also referred to as a gearbox assembly 135. In this way, the fan 126 is drivingly coupled to, and powered by, the turbo-engine 104, and the engine 100 is an indirect drive engine. The gearbox assembly 135 may be a reduction gearbox assembly for adjusting the rotational speed of the fan shaft 133 and, thus, the fan 126 relative to the LP shaft 124 when power is transferred from the LP shaft 124 to the fan shaft 133.

Referring still to the exemplary embodiment of FIG. 2, the disk 130 is covered by a fan hub 132 that is aerodynamically contoured to promote an airflow through the plurality of fan blades 128. In addition, the fan section 102 includes an annular fan casing or a nacelle 134 that circumferentially surrounds the fan 126 and at least a portion of the turbo-engine 104. The nacelle 134 is supported relative to the turbo-engine 104 by a plurality of outlet guide vanes 136 that are circumferentially spaced about the nacelle 134 and the turbo-engine 104. Moreover, a downstream section 138 of the nacelle 134 extends over an outer portion of the turbo-engine 104, and, with the outer casing 106, defines a bypass airflow passage 140 therebetween.

During operation of the engine 100, a volume of air enters the turbine engine (e.g., engine 100) through an engine inlet 129 of the nacelle 134 or the fan section 102. As the volume of air passes across the fan blades 128, a first portion of air, also referred to as bypass air 137, is routed into the bypass airflow passage 140, and a second portion of air, also referred to as core air 139, is routed into the upstream section of the core air flow path 121 through the core inlet 108 of the LP compressor 110. The ratio between the bypass air 137 and the core air 139 is commonly known as a bypass ratio. The pressure of the core air 139 is then increased in the compressor section 103 and, more specifically, the LP compressor 110, generating compressed air 141. The compressed air 141 is routed through the HP compressor 112, where the compressed air 141 is further compressed, and into the combustion section 114, where the compressed air 141 is mixed with fuel and ignited to generate combustion gases 143.

The combustion gases 143 are routed into the HP turbine 116 and expanded through the HP turbine 116 where a portion of thermal energy or kinetic energy from the combustion gases 143 is extracted via one or more stages of HP turbine stator vanes and HP turbine rotor blades that are coupled to the HP shaft 122. This causes the HP shaft 122 to rotate, thereby supporting operation of the HP compressor 112 (self-sustaining cycle). In this way, the combustion gases 143 do work on the HP turbine 116. The combustion gases 143 are then routed into the LP turbine 118 and expanded through the LP turbine 118. Here, a second portion of the thermal energy or the kinetic energy is extracted from the combustion gases 143 via one or more stages of LP turbine stator vanes and LP turbine rotor blades that are coupled to the LP shaft 124. This causes the LP shaft 124 to rotate, thereby supporting operation of the LP compressor 110 (self-sustaining cycle) and rotation of the fan 126 via the gearbox assembly 135. In this way, the combustion gases 143 do work on the LP turbine 118.

The combustion gases 143 are subsequently routed through the jet exhaust nozzle section 120 of the turbo-engine 104 to provide propulsive thrust. Simultaneously, the bypass air 137 is routed through the bypass airflow passage 140 before being exhausted from a fan nozzle exhaust section of the engine 100, also providing propulsive thrust. The HP turbine 116, the LP turbine 118, and the jet exhaust nozzle section 120 at least partially define a hot gas path for routing the combustion gases 143 through the turbo-engine 104.

The engine 100 is operable with the fuel system 150 and receives a flow of fuel from the fuel system 150. The fuel system 150 includes a fuel delivery assembly 153 providing the fuel flow from the fuel tank 151 to the engine 100, and, more specifically, to a plurality of fuel injectors 200 that inject fuel into a combustion chamber 302 of a combustor 300 (see FIG. 4, discussed further below) of the combustion section 114.

The components of the fuel system 150, and, more specifically, the fuel tank 151, is an example of a fuel source that provides fuel to the fuel injectors 200, as discussed in more detail below. The fuel delivery assembly 153 includes tubes, pipes, conduits, and the like, to fluidly connect the various components of the fuel system 150 to the engine 100. The fuel tank 151 is configured to store the hydrocarbon fuel, and the hydrocarbon fuel is supplied from the fuel tank 151 to the fuel delivery assembly 153. The fuel delivery assembly 153 is configured to carry the hydrocarbon fuel between the fuel tank 151 and the engine 100 and, thus, provides a flow path (fluid pathway) of the hydrocarbon fuel from the fuel tank 151 to the engine 100.

The fuel system 150 includes at least one fuel pump fluidly connected to the fuel delivery assembly 153 to induce the flow of the fuel through the fuel delivery assembly 153 to the engine 100. One such pump is a main fuel pump 155. The main fuel pump 155 is a high-pressure pump that is the primary source of pressure rise in the fuel delivery assembly 153 between the fuel tank 151 and the engine 100. The main fuel pump 155 may be configured to increase a pressure in the fuel delivery assembly 153 to a pressure greater than a pressure within the combustion chamber 302 of the combustor 300 (see FIG. 4, discussed further below) of the combustion section 114.

The fuel system 150 also includes a fuel metering unit 157 in fluid communication with the fuel delivery assembly 153. Any suitable fuel metering unit 157 may be used including, for example, a metering valve. The fuel metering unit 157 is positioned downstream of the main fuel pump 155 and upstream of a fuel manifold 159 configured to distribute fuel to the fuel injectors 200. The fuel system 150 is configured to provide the fuel to the fuel metering unit 157, and the fuel metering unit 157 is configured to receive fuel from the fuel tank 151. The fuel metering unit 157 is further configured to provide a flow of fuel to the engine 100 in a desired manner. More specifically, the fuel metering unit 157 is configured to meter the fuel and to provide a desired volume of fuel, at, for example, a desired flow rate, to the fuel manifold 159 of the engine 100. The fuel manifold 159 is fluidly connected to the fuel injectors 200 and distributes (provides) the fuel received to the plurality of fuel injectors 200, where the fuel is injected into the combustion chamber 302 and combusted. Adjusting the fuel metering unit 157 changes the volume of fuel provided to the combustion chamber 302 and, thus, changes the amount of propulsive thrust produced by the engine 100 to propel the aircraft 20.

The engine 100 also includes various accessory systems to aid in the operation of the engine 100 and/or an aircraft that includes the engine 100. For example, the engine 100 may include a main lubrication system 162, a compressor cooling air (CCA) system 164, an active thermal clearance control (ATCC) system 166, and a generator lubrication system 168, each of which is depicted schematically in FIG. 2. The main lubrication system 162 is configured to provide a lubricant to, for example, various bearings and gear meshes in the compressor section, the turbine section, the HP shaft 122, and the LP shaft 124. The lubricant provided by the main lubrication system 162 may increase the useful life of such components and may remove a certain amount of heat from such components through the use of one or more heat exchangers. The compressor cooling air (CCA) system 164 provides air from one or both of the HP compressor 112 or the LP compressor 110 to one or both of the HP turbine 116 or the LP turbine 118. The active thermal clearance control (ATCC) system 166 acts to minimize a clearance between tips of turbine blades and casing walls as casing temperatures vary during a flight mission. The generator lubrication system 168 provides lubrication to an electronic generator (not shown), as well as cooling/heat removal for the electronic generator. The electronic generator may provide electrical power to, for example, a startup electrical motor for the engine 100 and/or various other electronic components of the engine 100 and/or an aircraft including the engine 100. The lubrication systems for the engine 100 (e.g., the main lubrication system 162 and the generator lubrication system 168) may use hydrocarbon fluids, such as oil, for lubrication, in which the oil circulates through inner surfaces of oil scavenge lines.

The engine 100 discussed herein is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as, direct drive configurations, fixed pitch fans, or other suitable numbers or arrangements of shafts, compressors, turbines, fans, etc. Further, although a particular engine 100 is depicted in FIG. 2, the nanophase separated catalytic coating disclosed herein may be used more generally and/or with other engine embodiments. For example, in alternative embodiments, aspects of the present disclosure may be incorporated into, or otherwise utilized with any other type of engine, such as reciprocating engines. Additionally, in still other exemplary embodiments, the exemplary engine 100 may include or be operably connected to any other suitable accessory systems. Additionally, or alternatively, the exemplary engine 100 may not include or be operably connected to one or more of the accessory systems 162, 164, 166, and 168, discussed above.

Figure 3:
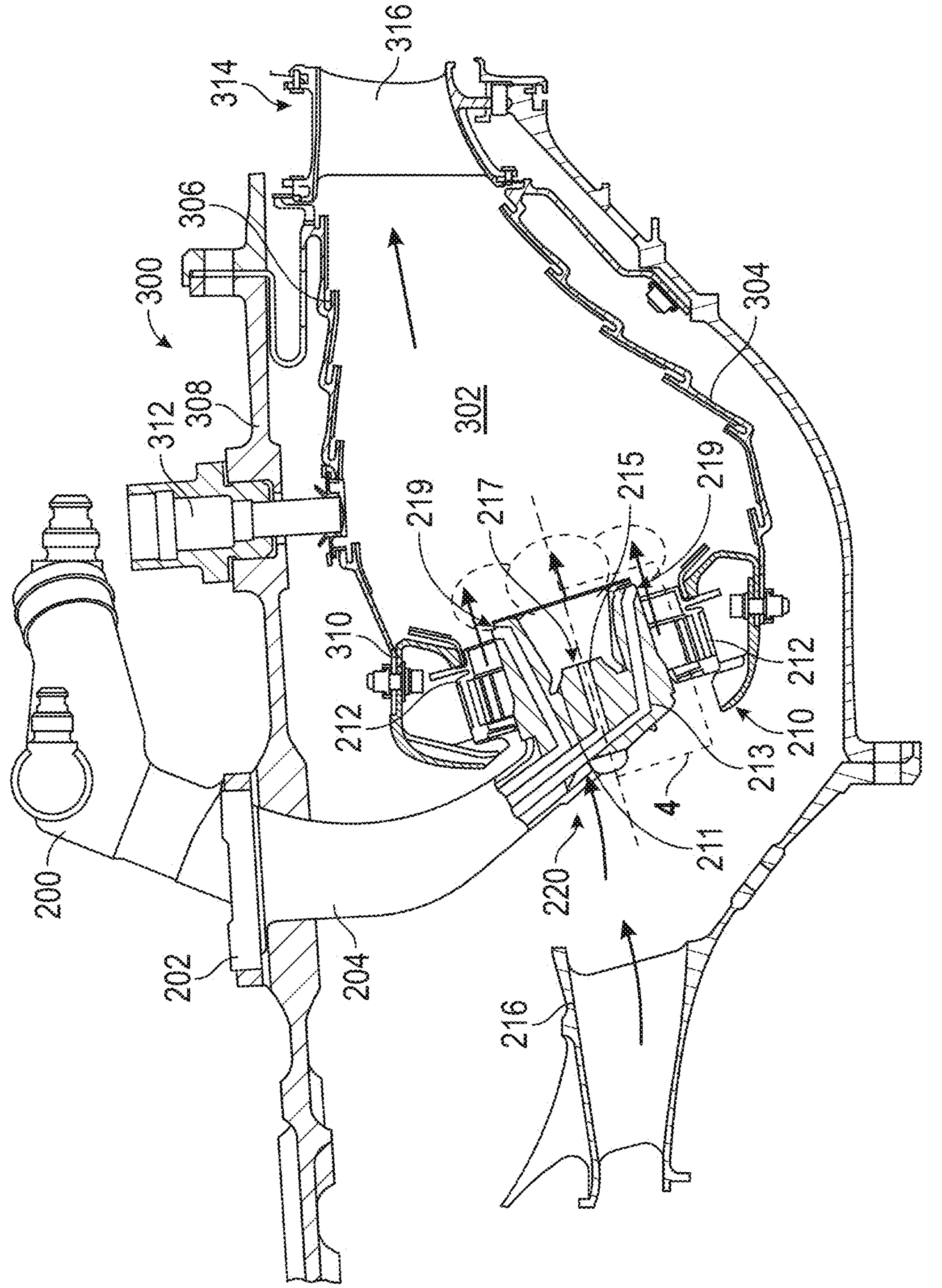
FIG. 3 is a cross-sectional view of a combustor of the gas turbine engine shown in FIG. 2 according to an embodiment of the present disclosure.

FIG. 3 shows a combustor 300 of the combustion section 114 (FIG. 2) according to an embodiment of the present disclosure. FIG. 3 is a detail view showing detail 3 in FIG. 2. The combustor 300 is an annular combustor that includes a combustion chamber 302 defined between an inner liner 304 and an outer liner 306. Each of the inner liner 304 and the outer liner 306 is annular about the longitudinal centerline axis 101 of the engine 100 (FIG. 2). The combustor 300 also includes a combustor case 308 that is also annular about the longitudinal centerline axis 101 of the engine 100. The combustor case 308 extends circumferentially around the inner liner 304 and the outer liner 306, and the inner liner 304 and the outer liner 306 are located radially inward of the combustor case 308. The combustor 300 also includes a dome 310 mounted to a forward end of each of the inner liner 304 and the outer liner 306. The dome 310 defines an upstream end (or forward end) of the combustion chamber 302.

A plurality of mixer assemblies 210 (only one is illustrated in FIG. 3) are spaced around the dome 310. The plurality of mixer assemblies 210 are circumferentially spaced about the longitudinal centerline axis 101 of the engine 100 (FIG. 2). In the embodiment shown in FIG. 3, each mixer assembly 210 is a twin annular premixing swirler (TAPS) that includes a main mixer 212 and a pilot mixer 211. The pilot mixer 211 is supplied with fuel from the fuel injector 200 during the entire engine operating cycle. Fuel flows along a pilot fuel passage 215 and out one or more pilot fuel injection orifices 217 into the combustion chamber 302. The main mixer 212 is supplied with fuel from the fuel injector 200 only during increased power conditions of the engine operating cycle, such as take-off and climb, for example. Fuel flows along a main fuel passage 213 and out one or more main fuel injection orifices 219 into the combustion chamber 302. The TAPS mixer assembly 210 is provided by way of example and the nanophase separated catalytic coating discussed herein may be applied to other mixer assembly designs and other combustor designs.

As noted above, the compressor section, including the HP compressor 112 (FIG. 2), pressurizes air, and the combustor 300 receives an annular stream of this pressurized air from a discharge outlet (compressor discharge outlet 216) of the HP compressor 112. This air may be referred to as compressor discharge pressure air. A portion of the compressor discharge air flows into the mixer assembly 210. Fuel is injected into the air in the mixer assembly 210 to mix with the air and to form a fuel-air mixture. The fuel-air mixture is provided to the combustion chamber 302 from the mixer assembly 210 for combustion. Ignition of the fuel-air mixture is accomplished by an igniter 312, and the resulting combustion gases flow in an axial direction toward and into an annular, first stage turbine nozzle 314. The first stage turbine nozzle 314 is defined by an annular flow channel that includes a plurality of radially extending, circularly-spaced nozzle vanes 316 that turn the gases so that they flow angularly and impinge upon the first stage turbine blades (not shown) of a first turbine (not shown) of the HP turbine 116 (FIG. 2).

The fuel injector 200 is fixed to the combustor case 308 by a nozzle mount. In this embodiment, the nozzle mount is a flange 202 that is integrally formed with a stem 204 of the fuel injector 200. The flange 202 is fixed to the combustor case 308 and sealed to the combustor case 308. The stem 204 includes a flow passage through which the hydrocarbon fuel flows, and the stem 204 extends radially inward from the flange 202. The fuel injector 200 also includes a fuel nozzle tip 220 through which fuel is injected into the combustion chamber 302 as part of the mixer assembly 210.

Figure 4:
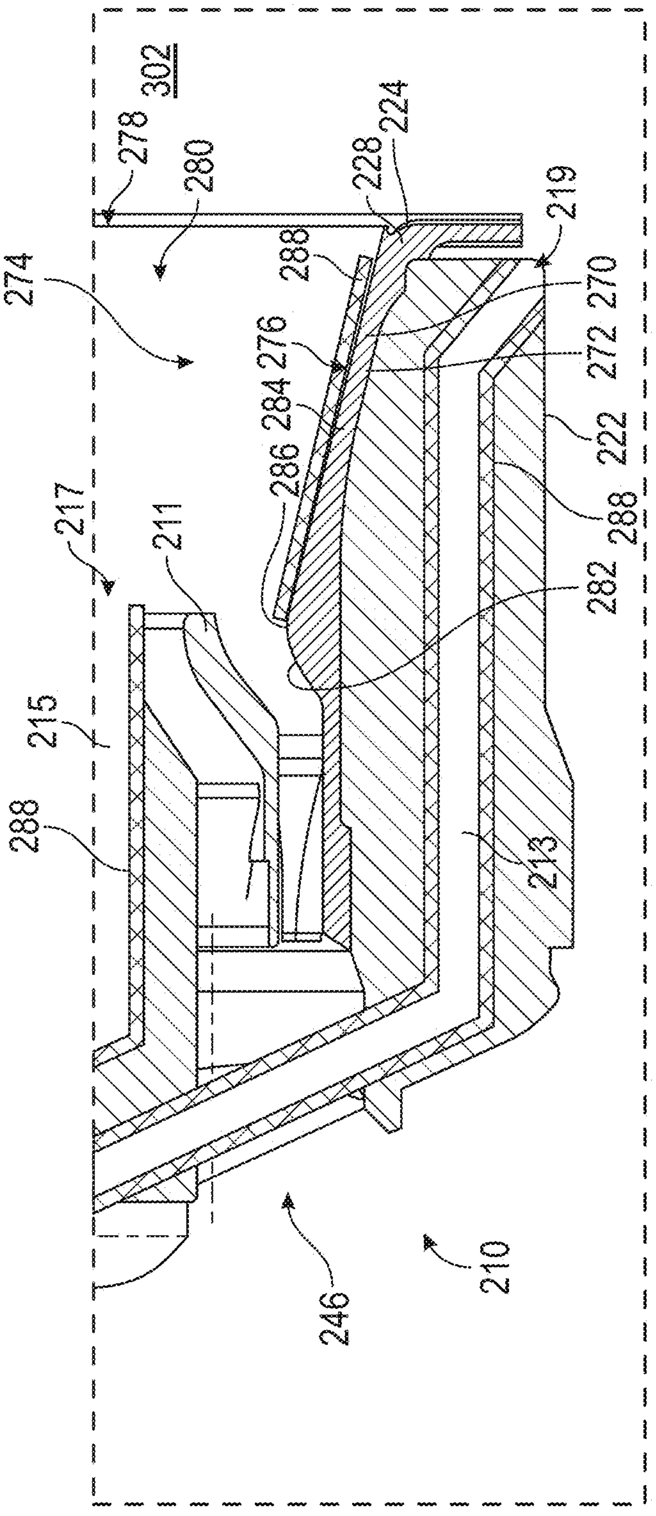
FIG. 4 is a cross-sectional view of a mixer assembly of the combustor in FIG. 3.

FIG. 4 shows the mixer assembly 210 of the combustor 300 shown in FIG. 3. FIG. 4 is a detail view showing detail 4 in FIG. 3, and, as FIG. 3 is a cross-sectional view, FIG. 4 is also a cross-sectional view of the mixer assembly 210. The fuel nozzle tip 220 (FIG. 3) includes a fuel nozzle body 222 and an aft heat shield 224 attached to the fuel nozzle body 222. The fuel nozzle body 222 may be mounted to, e.g., an inlet fairing. The inlet fairing is connected to or integral with the stem 204 (FIG. 3). The fuel nozzle body 222 can include the pilot mixer 211. The pilot mixer 211 and the pilot fuel injection orifice 217 can be centered in an annular pilot inlet 246. The fuel nozzle body 222 can also include the main fuel passages 213 and main fuel injection orifices 219, which may be collectively referred to as a main fuel nozzle. The main fuel nozzle (including the main fuel passages 213 and main fuel injection orifices 219) surrounds the pilot inlet 246, and the pilot inlet 246 is located between the main fuel nozzle and the pilot fuel injection orifice 217. In this embodiment, the fuel nozzle tip 220 (see FIG. 3) is circular about an axis extending through the center of the pilot fuel injection orifice 217. In the discussion below, various features of the fuel nozzle tip 220 may be discussed relative to this axis. The main fuel passage 213, the pilot fuel passage

215, the pilot fuel injection orifice 217, the main fuel injection orifice 219 can each be formed in portions of the fuel nozzle body 222. Each of the main fuel passage 213 and the pilot fuel passage 215 can be defined by one or more walls formed in the fuel nozzle body 222.

As noted above, fuel is provided through the stem 204 to the main fuel injection orifices 219. The main fuel injection orifices 219 can inject fuel in a radially outward direction through a circular array of the main fuel injection orifices 219 formed on an outer surface of the fuel nozzle body 222. Fuel is also provided through the stem 204 to the pilot fuel injection orifice 217. The pilot mixer 211 is supported by an annular pilot housing 270. Fuel in the fuel circuit components can be heated (e.g., from three hundred degrees Fahrenheit to five hundred degrees Fahrenheit) due to heat transfer from hot sections near the combustion section after the gas turbine engine is shut down. As discussed above, this heat transfer can lead to soak-back coke formation when fuel remaining in the fuel circuit components form coke. The coke forming on such materials may be strongly bound to these metallic components, e.g., of the fuel nozzle tip 220, the main fuel passage 213, the pilot fuel passage 215, the pilot fuel injection orifice 217, the main fuel injection orifice 219, or combinations thereof, leading to the formation of a thick layer of coke, e.g., coke with large particles, polymeric coke, and/or autoxidation coke. The nanophase separated catalytic coating 288 can be applied to various components of the TAPS mixer assembly 210 such as, for example, the pilot fuel passage 215, the pilot fuel injection orifice 217, the main fuel passage 213, the main fuel injection orifice 219, or combinations thereof. More specifically, the nanophase separated catalytic coating 288 can be applied to the walls define the pilot fuel passage 215, the main fuel passage 213, or both.

The pilot mixer 211 is supported by the annular pilot housing 270. The pilot housing 270 includes a conical wall section 272 circumscribing a conical pilot mixing chamber 274 that is in flow communication with, and downstream from, the pilot mixer 211. The pilot mixing chamber 274 is also fluidly connected to the pilot fuel injection orifice 217, and downstream of the pilot fuel injection orifice 217. The pilot mixing chamber 274 is a passage of the fuel injector 200 and, more specifically, the fuel nozzle tip 220. As the fuel nozzle tip 220 is also a portion of the mixer assembly 210, the pilot mixing chamber 274 also is a passage of the mixer assembly 210.

The conical wall section 272 of the pilot housing 270 is thus a passage wall that includes a passage wall surface 276 facing the pilot mixing chamber 274 (passage). In this embodiment, the conical wall section 272 is part of a second venturi 280 formed by the pilot housing 270. The second venturi 280 includes a converging section 282, a diverging section 284, and a throat 286 between the converging section 282 and the diverging section 284. The diverging section 284 is provided by the conical wall section 272, which extends downstream from the throat 286 and continues with exposed surfaces 228 of the aft heat shield 224. The exposed surfaces 228 of this embodiment form a conical wall section of the aft heat shield 224 that is coplanar with the passage wall surface 276 of the conical wall section 272. Diverging section 284 has an upstream end, which, in this embodiment, is the throat 286 and a downstream end, which, in this embodiment, is an outlet 278 of the pilot mixing chamber 274. As can be seen in FIG. 4, the cross-sectional area of the second venturi 280 at the outlet 278 (the downstream end) is greater than the cross-sectional area of the second venturi 280 at the throat 286 (the upstream end).

Air flows through pilot mixer 211 through the converging section 282 toward the throat 286. This air is mixed with the fuel-air mixture from the outlet and moves through the throat 286 to the diverging section 284 and the aft heat shield 224. The pilot mixing chamber 274 and, more specifically, the passage wall surface 276 of the conical wall section 272 are exposed to hydrocarbon fuel as the fuel-air mixture flows through the pilot mixing chamber 274, through the outlet 278 of the pilot mixing chamber 274, and into the combustion chamber 302. Being adjacent to the combustion chamber 302 and adjacent to the primary combustion zone, the fuel, the conical wall section 272, and the aft heat shield 224 are exposed to high temperatures. For example, the conical wall section 272 and the aft heat shield 224 may be at temperatures from three hundred degrees Celsius to six hundred degrees Celsius and from six hundred degrees Celsius to one thousand four hundred degrees Celsius, respectively.

The pilot housing 270 is made from materials suitable for use in these high temperature environments including, for example, stainless steel, corrosion-resistant alloys of nickel and chromium, and high-strength nickel-base alloys. The pilot housing 270 may thus be formed from a metal alloy chosen from the group consisting of iron-based alloys, nickel-based alloys, cobalt-based alloys, and chromium-based alloys. These types of metal alloys can serve as substrates for the nanophase separated catalytic coating. For example, in some embodiments, the nanophase separated catalytic coating is deposited on a metal substrate formed from a metal alloy chosen from the group consisting of iron-based alloys, nickel-based alloys, cobalt-based alloys, and chromium-based alloys.

As noted above, the pilot mixing chamber 274 is a passage, and, in embodiments discussed herein, a portion of the wall of the passage is a coated passage wall that is coated with the nanophase separated catalytic coating 288. The coated passage wall is located downstream of the pilot fuel injection orifice 217. As noted above, air flows through the pilot mixing chamber 274 (passage) and is introduced by an air inlet. In these embodiments, the air inlet is upstream of the coated passage wall. More specifically, air is introduced into the pilot mixing chamber 274 (passage) by the pilot inlet 246.

The nanophase separated catalytic coating 288 can be applied to any of the regions discussed above. Depending on the application region, the thickness of the nanophase separated catalytic coating 288 can be suitably determined to account for, for example, the coke buildup rate, catalyst wear rate, etc. For example, the thickness of the nanophase separated catalytic coating 288 can range from 0.02 micron to ten microns. In some embodiments, 0.02 micron to three microns can be applied by certain methods such as chemical bath deposition (CBD), sol-gel or dip-coating in a sol, chemical vapor deposition (CVD) and/or electrodeposition. Such thickness may be suitable for narrow inner diameter (e.g., 0.3 to 0.8 mm) fuel/oil circuits, for example in a main orifice or a valve region in an aircraft engine fuel nozzle.

The nanophase separated catalytic coating 288 may have a thickness of, for example, less than two hundred microns, such as less than one hundred microns, less than ten microns, less than five microns, or less than two microns. In some embodiments, the thickness of the nanophase separated catalytic coating 288 may be from one micron to two hundred microns. In other embodiments, the nanophase separated catalytic coating 288 may have a thickness of, for example, less than three hundred nanometers such as less than one hundred nanometers. In some embodiments, the thickness of the nanophase separated catalytic coating 288 may be from twenty nanometers to three hundred nanometers. In some embodiments, the thickness of the nanophase separated catalytic coating 288 may be from three hundred nanometers to ten microns.

Figure 5:
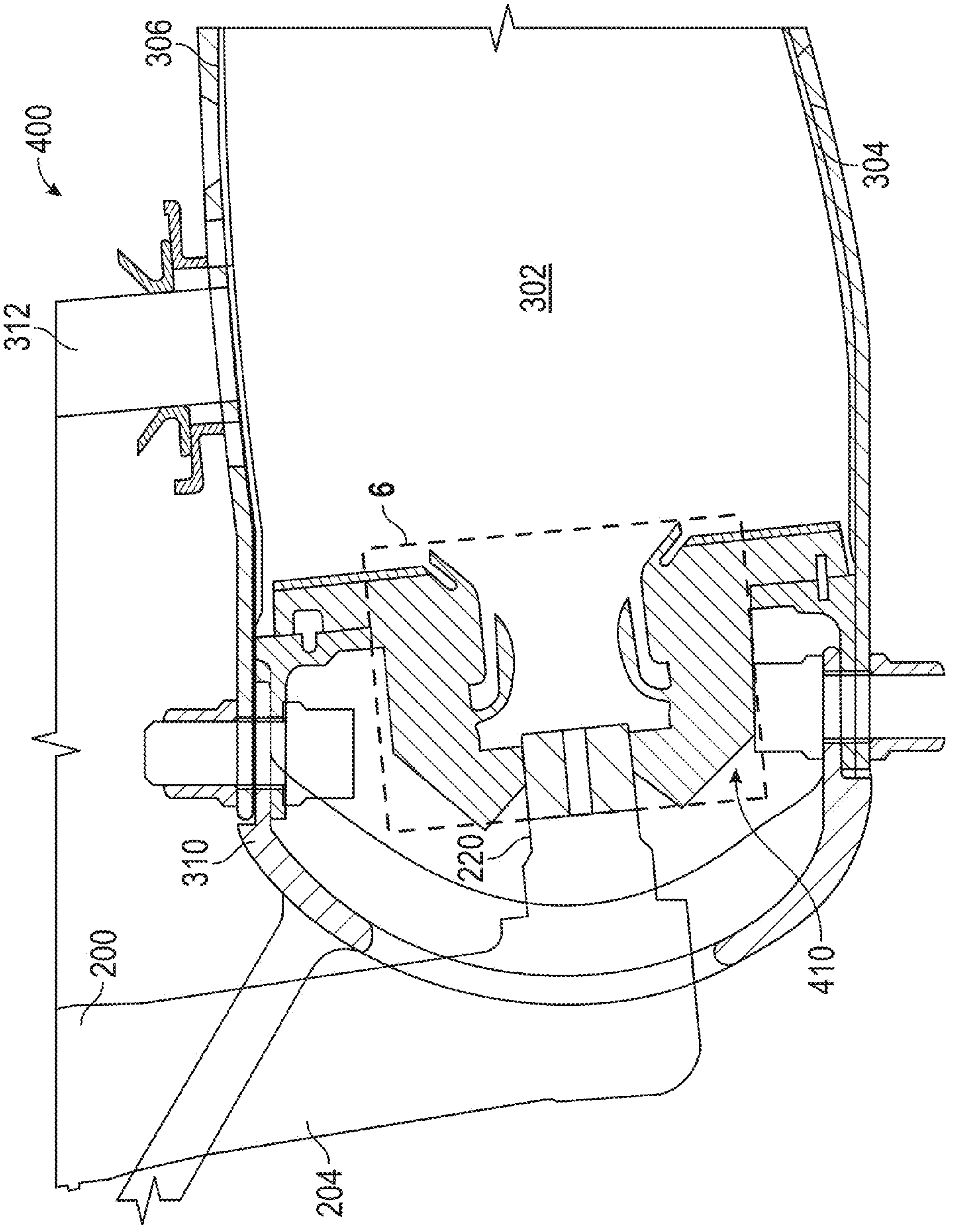
FIG. 5 is a cross-sectional view of a combustor of the gas turbine engine shown in FIG. 2 according to another embodiment of the present disclosure.
Figure 6:
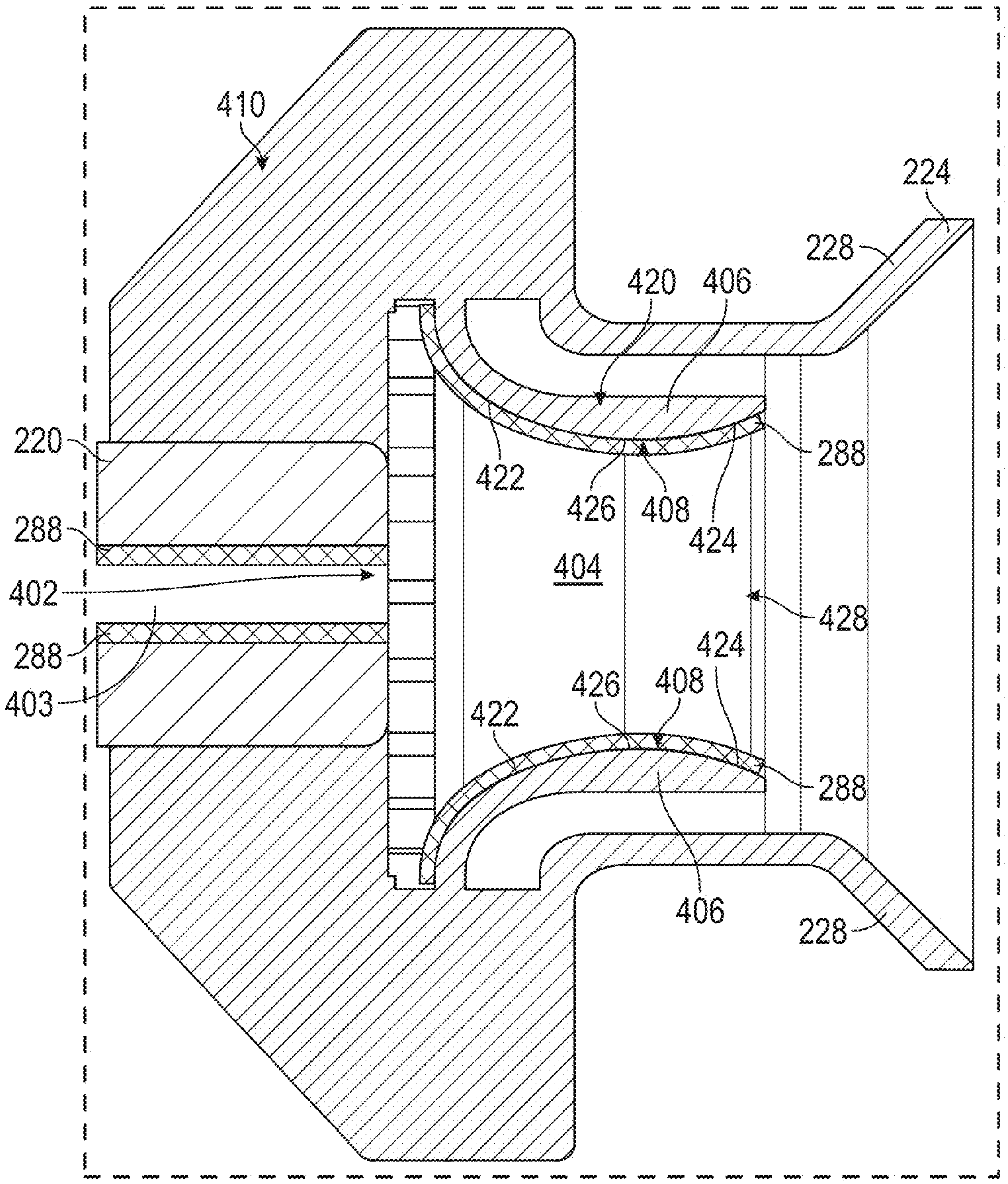
FIG. 6 is a cross-sectional view of a mixer assembly of the combustor shown in FIG. 5.

In the preceding discussion, the combustor 300 and the mixer assembly 210 were configured to use a twin annular premixing swirler (TAPS), but the nanophase separated catalytic coating 288 discussed herein may be applied to other mixer assembly designs and other combustor designs. Another example of a combustor 400 is shown in FIG. 5. FIG. 5 is a cross-sectional view of the combustor 400 showing a rich burn combustor design. FIG. 6 shows a mixer assembly 410 of the combustor 400 shown in FIG. 5. FIG. 6 is a detail view showing detail 6 in FIG. 5, and, as FIG. 5 is a cross-sectional view, FIG. 6 is also a cross-sectional view, of the mixer assembly 410. The combustor 400 and the mixer assembly 410 of this embodiment include the same or similar components as the combustor 300 and the mixer assembly 210 discussed above. Components in this embodiment that are the same as or similar to those discussed above are identified with the same reference numeral and a detailed description of these components is omitted.

The combustor 400 of this embodiment shows a rich burn combustor. A plurality of mixer assemblies 410 (only one is illustrated) are spaced around the dome 310. Fuel flows along the fuel passage 403 and is injected into the mixer assembly 410 by a fuel injection orifice 402. To reduce formation of coke, the fuel passage 403, the fuel injection orifice 402, or both can be coated with the nanophase separated catalytic coating 288. The fuel injection orifice 402 injects fuel in a generally downstream direction and into the compressed air flowing through a first swirler (not shown). The fuel is injected into a mixing chamber 404 that mixes the fuel with the compressed air to form a fuel-air mixture. As with the pilot mixing chamber 274 (FIG. 4) discussed above, the mixing chamber 404 of this embodiment is a passage of the fuel injector 200 with a wall section 406 that includes a passage wall surface 408 facing the mixing chamber 404 (passage). In this embodiment, wall section 406 is part of a venturi 420 that includes a converging section 422, a diverging section 424, and a throat 426 between the converging section 422 and the diverging section 424. In this embodiment, the nanophase separated catalytic coating 288 is formed on the surfaces of the venturi 420. The fuel-air mixture exits through an outlet 428 of the mixing chamber 404 and is combined with air flowing through a second swirler (not shown) at a position upstream of the exposed surfaces 228 of the aft heat shield 224.

Figure 7:
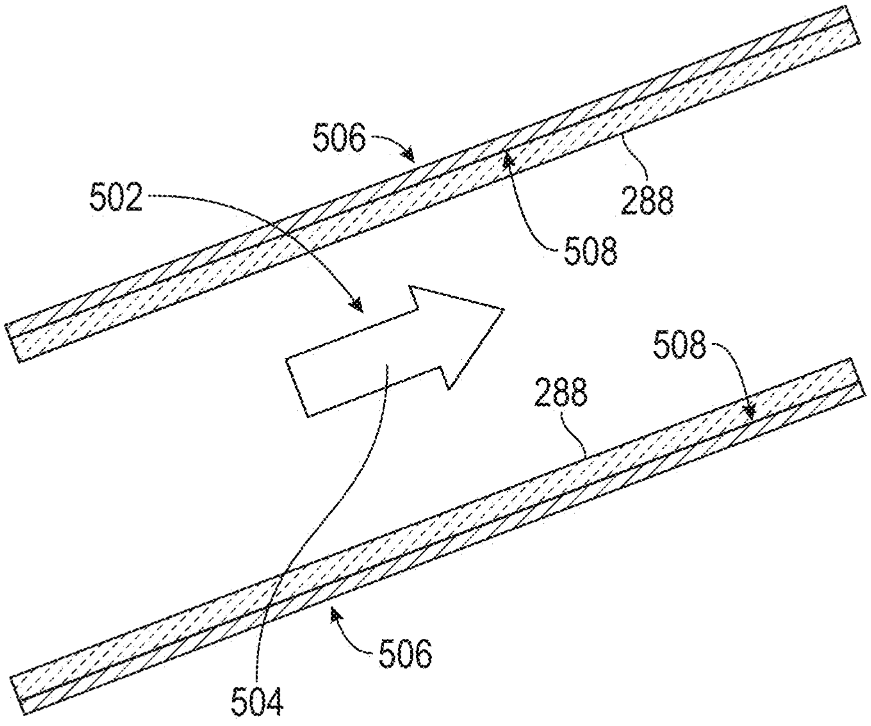
FIG. 7 is a cross-sectional view of a nanophase separated catalytic coating applied on a flow passage for a hydrocarbon fluid.

FIG. 7 is a cross-sectional view of a flow passage 502 for a hydrocarbon fluid 504. The flow passage 502 is defined, at least in part, by a substrate and, more specifically, a metal substrate 506. The metal substrate 506 includes a fluid passage facing surface 508 and the nanophase separated catalytic coating 288 is applied to the fluid passage facing surface 508. The nanophase separated catalytic coating 288 can be deposited on the metal substrate 506 to be exposed to the flow passage 502 for abating coke formation from the hydrocarbon fluid. The nanophase separated catalytic coating 288 can be exposed to the hydrocarbon fluid 504 within the flow passage 502 to abate coke formation therefrom, as discussed in more detail below. FIG. 7 can be, for example, one of the fuel passages discussed above, and in such a case, the hydrocarbon fluid is fuel. As discussed above, however, the nanophase separated catalytic coating 288 can be applied to any metal substrate defining, at least in part, a flow passage for a hydrocarbon fluid, and the flow passage 502 can be any passage for a hydrocarbon fluid that can experience coking. For example, fuel passage can be the fuel nozzle tip 220 (FIG. 3), the main fuel passage 213 (FIG. 3), the pilot fuel passage 215 (FIG. 3), the pilot fuel injection orifice 217 (FIG. 3), the main fuel injection orifice 219 (FIG. 3), the fuel injection orifice 402 (FIG. 6), the fuel passage 403 (FIG. 6), or combinations thereof. In still other examples, the hydrocarbon fluid may be oil and the metal substrate 506 defines, at least in part, a flow passage for the oil.

The preceding discussion is by way of example only and the nanophase separated catalytic coating 288 may be applied to any metal substrate defining, at least in part, a flow passage for a hydrocarbon fluid. The nanophase separated catalytic coating 288 can be deposited on the metal substrate to be exposed to the flow passage for abating coke formation from the hydrocarbon fluid. In some embodiments, the metal substrate is chosen from iron-based alloys, nickel-based alloys, cobalt-based alloys, chromium-based alloys, copper-based alloys, aluminum-based alloys, alloys containing cobalt and chromium, alloys containing platinum and aluminum, alloys containing nickel and aluminum, and alloys containing nickel, chromium, aluminum, and yttrium. In some embodiments, the metal substrate is an aircraft component such as those discussed above.

Figure 8B:
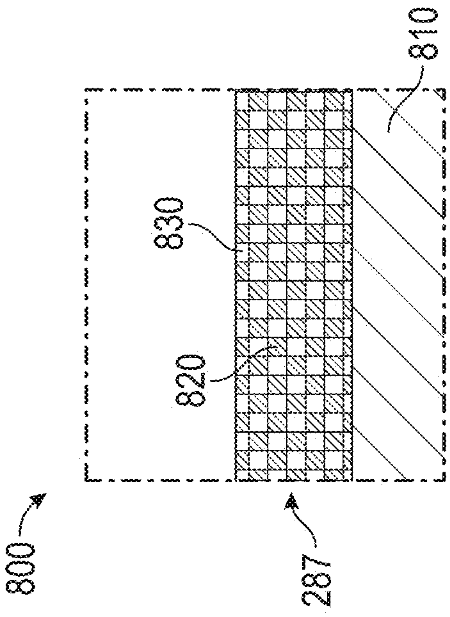
FIG. 8B depicts a detail view showing detail 8B of the coated substrate depicted in FIG. 8A.
Figure 8A:
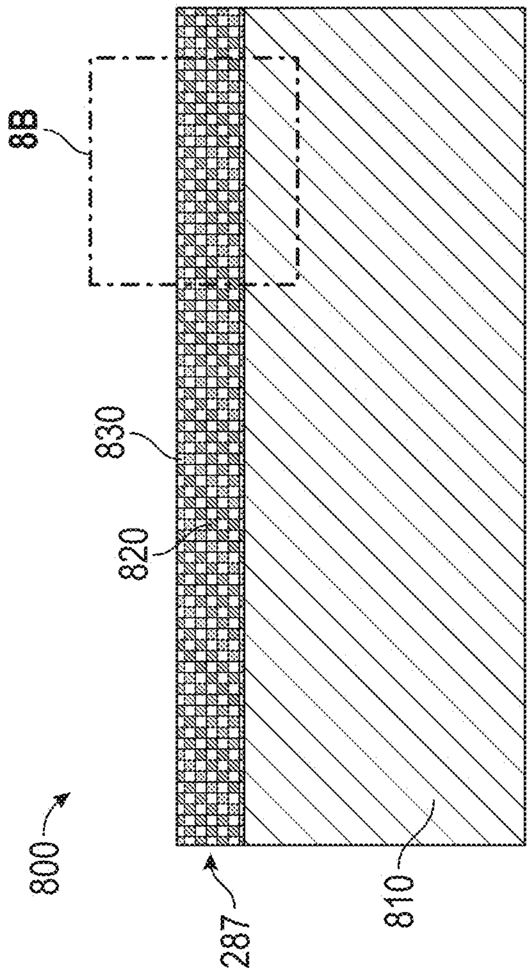
FIG. 8A depicts a schematic, cross-sectional view of a coated substrate according to an embodiment of the disclosure.

FIG. 8A is a schematic, cross-sectional view of a coated substrate 800 according to an embodiment of the disclosure. The coated substrate 800 includes a nanophase separated precursor coating 287 that is a precursor to the nanophase separated catalytic coating 288 discussed above. Formation of the nanophase separated catalytic coating 288 from the nanophase separated precursor coating 287 is described in detail below and with reference to FIG. 10.

The nanophase separated precursor coating 287 is deposited on a metal substrate 810. The metal substrate 810 can be a metal substrate chosen from iron-based alloys, nickel-based alloys, cobalt-based alloys, alloys containing cobalt and chromium, alloys containing platinum and aluminum, alloys containing nickel and aluminum, and alloys containing nickel, chromium, aluminum, and yttrium. For example, the metal substrate 810 can be a portion of an aircraft component such as a fluid passage, a fuel nozzle (e.g., the fuel nozzle tip 220 (FIG. 3)), a valve orifice, a vane (e.g., the vanes 316 (FIG. 3)), a pilot orifice, a main orifice, a valve, a swirler, a venturi (e.g., second venturi 280 (FIG. 4) or venturi 420 (FIG. 6)), a heat exchanger, and a lube oil system component, e.g., as discussed above.

The nanophase separated precursor coating 287 includes a substantially pure transition metal phase 820 and a substantially pure noble metal phase 830. As discussed below, co-depositing a transition metal and a noble metal on the metal substrate 810 can generate a coated substrate including a nanophase separated precursor coating 287 when the transition metal and the noble metal are substantially immiscible. In some embodiments, the substantially pure transition metal phase 820, the substantially pure noble metal phase 830, or both, are homogenously distributed throughout the nanophase separated precursor coating 287, e.g., as depicted in FIG. 8A.

The transition metal and the noble metal can include any combination of transition metals and noble metals provided that the transition metals and the noble metals are substantially immiscible with each other. For example, in some embodiments, the substantially pure transition metal phase 820 includes a transition metal chosen from cobalt, molybdenum, manganese, titanium, niobium, chromium, nickel, and tantalum, and the substantially pure noble metal phase 830 includes a noble metal chosen from silver and platinum.

The nanophase separated precursor coating 287 can include various volume fractions of the substantially pure transition metal phase 820 and the substantially pure noble metal phase 830. The nanophase separated precursor coating 287 can include from twenty volume percent to eighty volume percent of the substantially pure transition metal phase 820 by total volume of the nanophase separated precursor coating 287. The nanophase separated precursor coating 287 can include from twenty volume percent to eighty volume percent of the substantially pure noble metal phase 830 by total volume of the nanophase separated precursor coating 287. Different volume fractions of the substantially pure transition metal phase 820 and the substantially pure noble metal phase 830 can be used to impact catalytic activity of the nanophase separated precursor coating 287. For example, in some embodiments, the nanophase separated precursor coating 287 may have a greater coking oxidation reaction rate when the nanophase separated precursor coating 287 has a greater volume percent of the substantially pure transition metal phase 820 and/or the nanophase separated precursor coating 287 may have a greater coking oxidation selectivity when the nanophase separated precursor coating 287 has a greater volume percent of the substantially pure noble metal phase 830.

FIG. 8B is a detail view showing detail 8B of the coated metal substrate 810 depicted in FIG. 8A. As discussed above, the nanophase separated precursor coating 287 includes the substantially pure transition metal phase 820 and the substantially pure noble metal phase 830. The substantially pure transition metal phase 820 can have an average grain size ranging from ten nanometers to five hundred nanometers. For example, the substantially pure transition metal phase 820 can have an average grain size ranging from ten nanometers to thirty nanometers. Similarly, the substantially pure noble metal phase 830 can have an average grain size ranging from ten nanometers to five hundred nanometers. For example, the substantially pure noble metal phase 830 can have an average grain size ranging from ten nanometers to thirty nanometers. The grain size of the substantially pure noble metal phase 830 and the substantially pure noble metal phase 830 can be independently chosen to provide enhanced catalytic performance. For example, smaller grain sizes can improve catalytic activity by increasing an area of interfacial boundaries between the substantially pure noble metal phase 830 and the substantially pure noble metal phase 830.

Figure 9A:
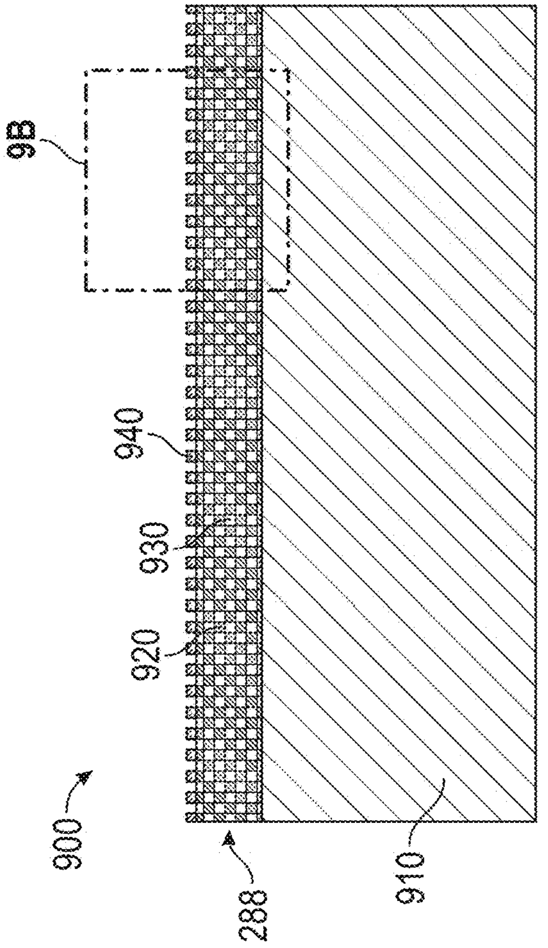
FIG. 9A depicts a schematic, cross-sectional view of a coated component according to an embodiment of the disclosure.

FIG. 9A is a schematic, cross-sectional view of a coated component 900 according to an embodiment of the disclosure. The coated component 900 includes a metal substrate 910 and a nanophase separated catalytic coating 288 deposited on the metal substrate 910. The nanophase separated catalytic coating 288 includes a substantially pure transition metal phase 920, a substantially pure noble metal phase 930, and a substantially pure transition metal oxide phase 940. As depicted in FIG. 9A, the substantially pure transition metal oxide phase 940 is in contact with at least a portion of the substantially pure transition metal phase 920. For example, the substantially pure transition metal oxide phase 940 can be in contact with a surface portion of the substantially pure transition metal phase 920, the substantially pure transition metal oxide phase 940 can be in contact with a portion of the substantially pure transition metal phase 920 that extends past a surface portion of the substantially pure transition metal phase 920 into a bulk portion of the substantially pure transition metal phase 920, or both.

To form the coated component 900 depicted in FIG. 9A, the coated substrate 800 depicted in FIG. 8A is oxidized, as discussed further below, to form the substantially pure transition metal oxide phase 940. Thus, the substantially pure transition metal phase 920 includes a transition metal, and the substantially pure transition metal oxide phase 940 includes an oxide of the transition metal. The nanophase separated precursor coating 287 shown in FIG. 8A including, more specifically, the substantially pure transition metal phase 820 and the substantially pure noble metal phase 830 may experience chemical and/or morphological changes when oxidizing the nanophase separated precursor coating 287 to generate the nanophase separated catalytic coating 288. The substantially pure transition metal oxide phase 940 may be formed in contact with the substantially pure transition metal phase 920. For example, the substantially pure transition metal oxide phase 940, the substantially pure transition metal phase 920, and the substantially pure noble metal phase 930 can be formed to maximize an interfacial area between the substantially pure transition metal oxide phase 940 and the substantially pure noble metal phase 930.

As discussed above, the metal substrate 910 can be a metal substrate chosen from iron-based alloys, nickel-based alloys, cobalt-based alloys, alloys containing cobalt and chromium, alloys containing platinum and aluminum, alloys containing nickel and aluminum, and alloys containing nickel, chromium, aluminum, and yttrium. For example, the metal substrate 910 can be a portion of an aircraft component such as a fluid passage, a fuel nozzle (e.g., the fuel nozzle tip 220 (FIG. 3)), a valve orifice, a vane (e.g., the vanes 316 (FIG. 3)), a pilot orifice, a main orifice, a valve, a swirler, a venturi (e.g., second venturi 280 (FIG. 4) or venturi 420 (FIG. 6)), a heat exchanger, and a lube oil system component, e.g., as discussed above.

Similarly, as discussed above, the substantially pure transition metal phase 920 includes a transition metal and the substantially pure noble metal phase 930 includes a noble metal. The transition metal and the noble metal can include any combination of transition metals and noble metals provided that the transition metals and the noble metals are substantially immiscible with each other. For example, in some embodiments, the substantially pure transition metal phase 920 includes a transition metal chosen from cobalt, molybdenum, manganese, titanium, niobium, chromium, nickel, and tantalum, and the substantially pure noble metal phase 930 includes a noble metal chosen from silver and platinum. The substantially pure transition metal oxide phase 940 includes an oxide of the transition metal in the substantially pure transition metal phase 920. Additionally, the substantially pure transition metal oxide phase 940 can include a p-block element chosen from lead, tin, bismuth, antimony, and tellurium. In some embodiments, the p-block element(s) are included in the substantially pure transition metal phase 920, the substantially pure noble metal phase 930, or both. In some embodiments, nanophase separated catalytic coating 288 has a composition chosen from $(\mathbf{M1})_x(\mathbf{M2})_y(\mathbf{M3})_z(\mathbf{M4})_u(\mathrm{N})_v\mathrm{O}_w$, $(\mathbf{P1})_x(\mathbf{P2})_y(\mathbf{P3})_z(\mathbf{P4})_u(\mathrm{N})_v\mathrm{O}_w$, and $(\mathbf{P1})_x(\mathbf{P2})_y(\mathbf{M1})_z(\mathbf{M2})_u(\mathrm{N})_v\mathrm{O}_w$, where M1, M2, M3, M4 are transition metals (e.g.: Co, Mo, Mn, Ti, Nb, Ta, etc.), P1, P2, P3, P4, P5 are p-block elements (e.g.: Pb, Sn, Bi, Sb, Te, etc.), N is a noble metal (e.g.: Ag, Pt), each of x, y, z, u, and v independently range from zero to one (e.g., 0.001 to 1), w is zero in a bulk portion of nanophase separated catalytic coating 288, and w/(x+y+z+u+v) ranges from one to two on a top oxidised surface of the nanophase separated catalytic coating 288.

The nanophase separated catalytic coating 288 can include various volume fractions of the substantially pure transition metal phase 920, the substantially pure noble metal phase 930, and the substantially pure transition metal oxide phase 940. The nanophase separated catalytic coating 288 can include from twenty volume percent to eighty volume percent of the substantially pure transition metal phase 920 by total volume of the nanophase separated catalytic coating 288. The nanophase separated catalytic coating 288 can include from twenty volume percent to eighty volume percent of the substantially pure noble metal phase 930 by total volume of the nanophase separated catalytic coating 288. The nanophase separated catalytic coating 288 can include from one volume percent to ten volume percent of the substantially pure transition metal oxide phase 940 by total volume of the nanophase separated catalytic coating 288. As discussed elsewhere herein, the substantially pure transition metal oxide phase 940 can be formed on a surface portion of the nanophase separated catalytic coating 288.

Without wishing to be bound by theory, activity of the nanophase separated catalytic coating 288 can be improved by increasing interphase boundaries near an outer surface of the nanophase separated catalytic coating 288 that is exposed to coke deposits. For example, in some embodiments (e.g., where each phase has a similar average grain size), the substantially pure transition metal oxide phase 940 and the substantially pure noble metal phase 930 may be present in the nanophase separated catalytic coating 288 at a one-to-one volume ratio to increasing interphase boundaries near the outer surface of the nanophase separated catalytic coating 288. Moreover, the durability of the nanophase separated catalytic coating 288 can be enhanced if the substantially pure transition metal phase 920 percolates through the nanophase separated catalytic coating 288 with the substantially pure transition metal oxide phase 940 embedded as islands. In some embodiments (e.g., where each phase has a dissimilar average grain size), the volume percent of each phase can be adjusted to improve performance of the nanophase separated catalytic coating 288 (e.g., by increasing interphase boundaries near the outer surface of the coating that is exposed to coke deposits.

Figure 9B:
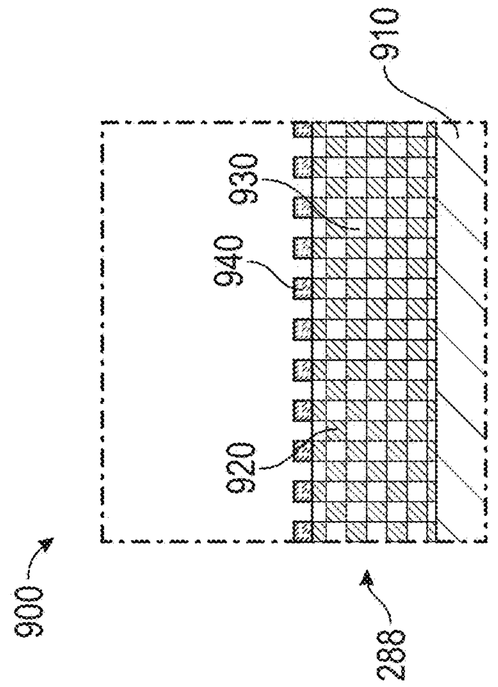
FIG. 9B depicts a detail view showing detail 9B of the coated component depicted in FIG. 9A.

FIG. 9B depicts a detail view showing detail 9B of the coated component 900 depicted in FIG. 9A. The substantially pure transition metal phase 920 can have an average grain size ranging from ten nanometers to five hundred nanometers. For example, the substantially pure transition metal phase 920 can have an average grain size ranging from ten nanometers to thirty nanometers. Similarly, the substantially pure noble metal phase 930 can have an average grain size ranging from ten nanometers to five hundred nanometers. For example, the substantially pure noble metal phase 930 can have an average grain size ranging from ten nanometers to thirty nanometers. Additionally, the substantially pure transition metal oxide phase 940 can have an average grain size ranging from ten nanometers to five hundred nanometers. For example, the substantially pure transition metal oxide phase 940 can have an average grain size ranging from ten nanometers to thirty nanometers. The grain size of the substantially pure transition metal phase 920, the substantially pure noble metal phase 930, and the substantially pure transition metal oxide phase 940 can be independently chosen to provide enhanced catalytic performance. For example, smaller grain sizes can improve catalytic activity by increasing an area of interfacial boundaries between the substantially pure transition metal phase 920, the substantially pure noble metal phase 930, and the substantially pure transition metal oxide phase 940, which can, e.g., be a number of reactive catalytic sites in the nanophase separated catalytic coating 288. Also, for example, smaller grain sizes can improve catalytic activity by increasing an area of interfacial area between the substantially pure transition metal phase 920, the substantially pure noble metal phase 930, the substantially pure transition metal oxide phase 940, and coke, thus, increasing catalytic activity of the nanophase separated catalytic coating 288.

Without wishing to be bound by theory, activity of the nanophase separated catalytic coating can be improved by increasing interphase boundaries near an outer surface of the coating that is exposed to coke deposits. For example, in some embodiments (e.g., where each phase has a similar average grain size), the substantially pure transition metal oxide phase 940 and the substantially pure noble metal phase 930 may be present in the nanophase separated catalytic coating at a one-to-one volume ratio to increasing interphase boundaries near the outer surface of the coating. Moreover, the durability of the nanophase separated catalytic coating can be enhanced if the substantially pure transition metal phase 920 percolates through the nanophase separated catalytic coating with the substantially pure transition metal oxide phase 940 embedded as islands. In some embodiments (e.g., when each phase has a dissimilar average grain size), the volume percent of each phase can be adjusted to improve performance of the nanophase separated catalytic coating (e.g., by increasing interphase boundaries near the outer surface of the coating that is exposed to coke deposits.

Figure 9C:
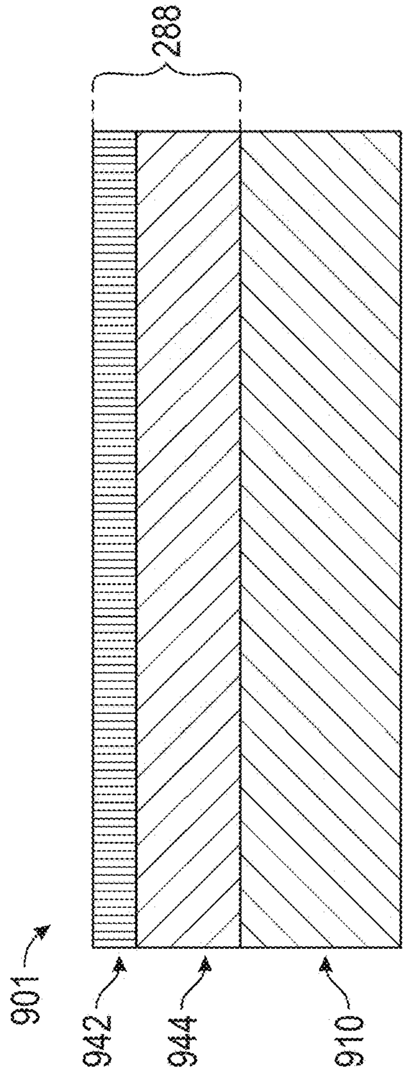
FIG. 9C is a schematic, cross-sectional view of a coated component according to an embodiment of the disclosure.

FIG. 9C is a schematic, cross-sectional view of a coated component 901 according to an embodiment of the disclosure. The coated component 901 includes the substantially pure transition metal oxide phase 940 as an outer region 942 of the nanophase separated catalytic coating 288, with the substantially pure transition metal phase 920 and the substantially pure noble metal phase 930 being an internal region 944 sandwiched between the outer region 942 and the metal substrate 910.

Figure 10:
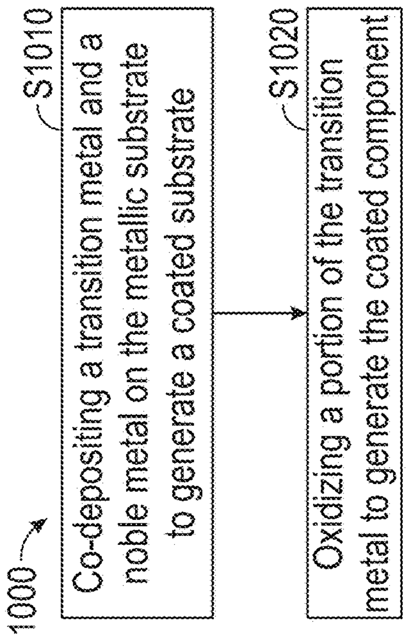
FIG. 10 is a flow chart showing a method of making a coated component according to an embodiment of the disclosure.

FIG. 10 is a flow chart showing a method 1000 of making the coated component 900 according to an embodiment of the disclosure. The method 1000 includes, in step S1010, co-depositing a transition metal and a noble metal on a metal substrate to generate the coated substrate 800 discussed above with reference to FIGS. 8A and 8B. The transition metal and the noble metal can be substantially immiscible. In some embodiments, the transition metal and the noble metal can be co-deposited by electrodeposition from a solution that includes the transition metal as dissolved ions and the noble metal as dissolved ions.

The method 1000 includes, in step S1020, oxidizing a portion of the transition metal to generate the coated component 900 discussed above with reference to FIGS. 9A and 9B. As noted above, the portion of the transition metal oxidized can be a surface portion of the transition metal. In some embodiments, in step S1020, the oxidizing includes heating the coated substrate 800 (FIGS. 8A and 8B) in an oxidizing environment (e.g., air). The heating can be performed at any temperature sufficient to oxidize the transition metal such as, e.g., a temperature ranging from two hundred degrees Celsius to five hundred degrees Celsius. In some embodiments, in step S1020, the oxidizing is sufficient to form the substantially pure transition metal oxide phase 940 as a coating on a surface portion of the substantially pure transition metal phase 920 (FIGS. 9A and 9B), the substantially pure transition metal oxide phase 940 as a coating on a portion of the substantially pure transition metal phase 920 that extends past a surface portion of the substantially pure transition metal phase 920 into a bulk portion of the substantially pure transition metal phase 920, or both, e.g., by oxidizing an amount of the transition metal that is less than an amount needed to form an integral outer layer of substantially pure transition metal oxide. In some embodiments, in step S1020, the oxidizing is sufficient to form a top composite layer including transition metal oxide(s) and noble metal with multitude of surface-connecting phase boundaries.

As discussed above, the nanophase separated catalytic coating 288 may be effective for coke abatement and may provide improved catalytic activity and/or selectivity as compared to a catalytic coating that does not have the nanophase separated morphology discussed above.

As discussed above, the nanophase separated catalytic coating may be effective for coke abatement and may be applied to various components such as aircraft components and/or gas turbine engine components.

Further aspects of the present disclosure are provided by the subject matter of the following clauses.

A coated component for coke abatement in a gas turbine engine, the coated component including a metal substrate and a nanophase separated catalytic coating. The metal substrate defines, at least in part, a flow passage for a hydrocarbon fluid. The nanophase separated catalytic coating is deposited on the metal substrate to be exposed to the flow passage for abating coke formation from the hydrocarbon fluid. The nanophase separated catalytic coating includes a substantially pure transition metal phase, a substantially pure noble metal phase, and a substantially pure transition metal oxide phase.

The coated component of the preceding clause, wherein the substantially pure transition metal phase has an average grain size ranging from ten nanometers to five hundred nanometers.

The coated component of any preceding clause, wherein the substantially pure noble metal phase has an average grain size ranging from ten nanometers to five hundred nanometers.

The coated component of any preceding clause, wherein the substantially pure transition metal oxide phase has an average grain size ranging from ten nanometers to five hundred nanometers.

The coated component of any preceding clause, wherein the substantially pure transition metal phase is homogenously distributed throughout the catalytic coating.

The coated component of any preceding clause, wherein the substantially pure noble metal phase is homogenously distributed throughout the catalytic coating.

The coated component of any preceding clause, wherein the substantially pure transition metal oxide phase is in contact with at least a portion of the substantially pure transition metal phase.

The coated component of any preceding clause, wherein the substantially pure transition metal phase includes a transition metal, and the substantially pure transition metal oxide phase includes an oxide of the transition metal.

The coated component of any preceding clause, wherein the catalytic coating has from twenty volume percent to eighty volume percent of the substantially pure transition metal phase by total volume of the catalytic coating.

The coated component of any preceding clause, wherein the catalytic coating has from one volume percent to ten volume percent of the substantially pure transition metal oxide phase by total volume of the catalytic coating.

The coated component of any preceding clause, wherein the catalytic coating has from twenty volume percent to eighty volume percent of the substantially pure noble metal phase by total volume of the catalytic coating.

The coated component of any preceding clause, wherein the substantially pure transition metal phase includes a transition metal, the substantially pure noble metal phase includes a noble metal, and the noble metal and the transition metal are substantially immiscible.

The coated component of any preceding clause, wherein the substantially pure transition metal phase includes a transition metal chosen from cobalt, molybdenum, manganese, titanium, niobium, chromium, nickel, and tantalum, and the substantially pure transition metal oxide phase includes an oxide of the transition metal.

The coated component of any preceding clause, wherein the substantially pure noble metal phase includes a noble metal chosen from silver and platinum.

The coated component of any preceding clause, wherein the substantially pure transition metal oxide phase includes a p-block element chosen from lead, tin, bismuth, antimony, and tellurium.

The coated component of any preceding clause, wherein the coated component is chosen from a fluid passage, a fuel nozzle, a valve orifice, a vane, a pilot orifice, a main orifice, a valve, a swirler, a venturi, a heat exchanger, and a lube oil system component.

A fuel nozzle for a gas turbine engine includes a fuel nozzle body and a fuel passage defined by one or more walls formed in the fuel nozzle. The fuel passage being a flow passage for a hydrocarbon fuel to flow therethrough. A nanophase separated catalytic coating is deposited on the one or more walls formed in the fuel nozzle to be exposed to the fuel passage for abating coke formation from the fuel. The nanophase separated catalytic coating includes a substantially pure transition metal phase, a substantially pure noble metal phase, and a substantially pure transition metal oxide phase.

The fuel nozzle of the preceding clause, further comprising a fuel ejection orifice fluidly connected to the fuel passage to receive the fuel from the fuel passage.

The fuel nozzle of any preceding clause, wherein the fuel nozzle body is a metal fuel nozzle body.

The fuel nozzle of any preceding clause, wherein the substantially pure transition metal phase has an average grain size ranging from ten nanometers to five hundred nanometers.

The fuel nozzle of any preceding clause, wherein the substantially pure noble metal phase has an average grain size ranging from ten nanometers to five hundred nanometers.

The fuel nozzle of any preceding clause, wherein the substantially pure transition metal oxide phase has an average grain size ranging from ten nanometers to five hundred nanometers.

The fuel nozzle of any preceding clause, wherein the substantially pure transition metal phase is homogenously distributed throughout the catalytic coating.

The fuel nozzle of any preceding clause, wherein the substantially pure noble metal phase is homogenously distributed throughout the catalytic coating.

The fuel nozzle of any preceding clause, wherein the substantially pure transition metal oxide phase is in contact with at least a portion of the substantially pure transition metal phase.

The fuel nozzle of any preceding clause, wherein the substantially pure transition metal phase includes a transition metal, and the substantially pure transition metal oxide phase includes an oxide of the transition metal.

The fuel nozzle of any preceding clause, wherein the catalytic coating has from twenty volume percent to eighty volume percent of the substantially pure transition metal phase by total volume of the catalytic coating.

The fuel nozzle of any preceding clause, wherein the catalytic coating has from one volume percent to ten volume percent of the substantially pure transition metal oxide phase by total volume of the catalytic coating.

The fuel nozzle of any preceding clause, wherein the catalytic coating has from twenty volume percent to eighty volume percent of the substantially pure noble metal phase by total volume of the catalytic coating.

The fuel nozzle of any preceding clause, wherein the substantially pure transition metal phase includes a transition metal, the substantially pure noble metal phase includes a noble metal, and the noble metal and the transition metal are substantially immiscible.

The fuel nozzle of any preceding clause, wherein the substantially pure transition metal phase includes a transition metal chosen from cobalt, molybdenum, manganese, titanium, niobium, chromium, nickel, and tantalum, and the substantially pure transition metal oxide phase includes an oxide of the transition metal.

The fuel nozzle of any preceding clause, wherein the substantially pure noble metal phase includes a noble metal chosen from silver and platinum.

The fuel nozzle of any preceding clause, wherein the substantially pure transition metal oxide phase includes a p-block element chosen from lead, tin, bismuth, antimony, and tellurium.

A combustor for a gas turbine engine includes an inner liner, an outer liner, and a mixer assembly. The outer liner is positioned opposite the inner liner to define a combustion chamber therebetween. The combustion chamber includes an upstream end. The mixer assembly is located at the upstream end of the combustion chamber and includes the fuel nozzle of any preceding clause.

The fuel nozzle of the preceding clause, further comprising a fuel ejection orifice fluidly connected to the fuel passage to receive the fuel from the fuel passage and inject the fuel into the combustion chamber.

A gas turbine engine for an aircraft includes a compressor, the combustor of the preceding clause, and a turbine. The compressor, the combustor, and the turbine defining, at least in an airflow passage. The compressor including a plurality of compressor blades operable to compress air flowing through the airflow passage and form compressed air. The combustor fluidly connected to the compressor to receive the compressed air and operable to inject fuel into the compressed air via the fuel nozzle and generate a fuel and air mixture. The fuel and air mixture being combusted in the combustion chamber to generate combustion products, and the turbine being fluidly connected to the combustion chamber to receive the combustion products. The turbine includes a plurality of turbine blades that are rotated by the combustion products flowing through the airflow passage.

The coated component of any preceding clause, wherein the substantially pure transition metal oxide phase is in contact with a surface portion of the substantially pure transition metal phase, the substantially pure transition metal oxide phase is in contact with a portion of the substantially pure transition metal phase that extends past a surface portion of the substantially pure transition metal phase into a bulk portion of the substantially pure transition metal phase, or both.

The coated component of any preceding clause, wherein the metal substrate is chosen from iron-based alloys, nickel-based alloys, cobalt-based alloys, alloys containing cobalt and chromium, alloys containing platinum and aluminum, alloys containing nickel and aluminum, and alloys containing nickel, chromium, aluminum, and yttrium.

A method of making the coated component of any preceding clause includes co-depositing a transition metal and a noble metal on the metal substrate to generate a coated substrate, wherein the transition metal and the noble metal are substantially immiscible, and oxidizing a portion of the transition metal to generate the coated component.

A method of coating a component includes co-depositing a transition metal and a noble metal on a metal substrate to generate a coated substrate and oxidizing a portion of the transition metal to generate a substantially pure transition metal phase, a substantially pure noble metal phase, and a substantially pure transition metal oxide phase.

The method of any preceding clause, wherein the transition metal and the noble metal are substantially immiscible.

The method of any preceding clause, wherein the co-depositing is an electrodeposition from a solution including the transition metal as dissolved ions and the noble metal as dissolved ions.

The method of any preceding clause, wherein the portion of the transition metal oxidized is a surface portion of the transition metal.

The method of any preceding clause, wherein the oxidizing includes heating the coated substrate in an oxidizing environment.

The method of the preceding clause, wherein the oxidizing environment is air.

The method of any preceding clause, wherein the oxidizing includes heating the coated substrate to a temperature ranging from two hundred degrees Celsius to five hundred degrees Celsius.

The method of any preceding clause, wherein the substantially pure transition metal phase has an average grain size ranging from ten nanometers to five hundred nanometers.

The method of any preceding clause, wherein the substantially pure noble metal phase has an average grain size ranging from ten nanometers to five hundred nanometers.

The method of any preceding clause, wherein the substantially pure transition metal oxide phase has an average grain size ranging from ten nanometers to five hundred nanometers.

The method of any preceding clause, wherein the substantially pure transition metal phase is homogenously distributed throughout the catalytic coating.

The method of any preceding clause, wherein the substantially pure noble metal phase is homogenously distributed throughout the catalytic coating.

The method of any preceding clause, wherein the substantially pure transition metal oxide phase is in contact with at least a portion of the substantially pure transition metal phase.

The method of any preceding clause, wherein the substantially pure transition metal phase includes a transition metal, and the substantially pure transition metal oxide phase includes an oxide of the transition metal.

The method of any preceding clause, wherein the catalytic coating has from twenty volume percent to eighty volume percent of the substantially pure transition metal phase by total volume of the catalytic coating.

The method of any preceding clause, wherein the catalytic coating has from one volume percent to ten volume percent of the substantially pure transition metal oxide phase by total volume of the catalytic coating.

The method of any preceding clause, wherein the catalytic coating has from twenty volume percent to eighty volume percent of the substantially pure noble metal phase by total volume of the catalytic coating.

The method of any preceding clause, wherein the substantially pure transition metal phase includes a transition metal, the substantially pure noble metal phase includes a noble metal, and the noble metal and the transition metal are substantially immiscible.

The method of any preceding clause, wherein the substantially pure transition metal phase includes a transition metal chosen from cobalt, molybdenum, manganese, titanium, niobium, chromium, nickel, and tantalum, and the substantially pure transition metal oxide phase includes an oxide of the transition metal.

The method of any preceding clause, wherein the substantially pure noble metal phase includes a noble metal chosen from silver and platinum.

The method of any preceding clause, wherein the substantially pure transition metal oxide phase includes a p-block element chosen from lead, tin, bismuth, antimony, and tellurium.

Although the foregoing description is directed to some exemplary embodiments of the present disclosure, other variations and modifications will be apparent to those skilled in the art, and may be made without departing from the disclosure. Moreover, features described in connection with one embodiment of the present disclosure may be used in conjunction with other embodiments, even if not explicitly stated above.

The invention claimed is:

1. A coated component for coke abatement in a gas turbine engine, the coated component comprising:

a metal substrate defining, at least in part, a flow passage for a hydrocarbon fluid; and a nanophase separated catalytic coating deposited on the metal substrate to be exposed to the flow passage for abating coke formation from the hydrocarbon fluid, the nanophase separated catalytic coating including a substantially pure transition metal phase, a substantially pure noble metal phase, and a substantially pure transition metal oxide phase.

2. The coated component of claim 1, wherein the substantially pure transition metal phase has an average grain size ranging from ten nanometers to five hundred nanometers.

3. The coated component of claim 1, wherein the substantially pure noble metal phase has an average grain size ranging from ten nanometers to five hundred nanometers.

4. The coated component of claim 1, wherein the substantially pure transition metal oxide phase has an average grain size ranging from ten nanometers to five hundred nanometers.

5. The coated component of claim 1, wherein the substantially pure transition metal phase is homogenously distributed throughout the catalytic coating.

6. The coated component of claim 1, wherein the substantially pure noble metal phase is homogenously distributed throughout the catalytic coating.

7. The coated component of claim 1, wherein the substantially pure transition metal oxide phase is in contact with at least a portion of the substantially pure transition metal phase.

8. The coated component of claim 1, wherein the substantially pure transition metal phase includes a transition metal, and the substantially pure transition metal oxide phase includes an oxide of the transition metal.

9. The coated component of claim 1, wherein the catalytic coating has from twenty volume percent to eighty volume percent of the substantially pure transition metal phase by total volume of the catalytic coating.

10. The coated component of claim 1, wherein the catalytic coating has from one volume percent to ten volume percent of the substantially pure transition metal oxide phase by total volume of the catalytic coating.

11. The coated component of claim 1, wherein the catalytic coating has from twenty volume percent to eighty volume percent of the substantially pure noble metal phase by total volume of the catalytic coating.

12. The coated component of claim 1, wherein the substantially pure transition metal phase includes a transition metal, the substantially pure noble metal phase includes a noble metal, and the noble metal and the transition metal are substantially immiscible.

13. The coated component of claim 1, wherein the substantially pure transition metal phase includes a transition metal chosen from cobalt, molybdenum, manganese, titanium, niobium, chromium, nickel, and tantalum, and the substantially pure transition metal oxide phase includes an oxide of the transition metal.

14. The coated component of claim 1, wherein the substantially pure noble metal phase includes a noble metal chosen from silver and platinum.

15. The coated component of claim 1, wherein the substantially pure transition metal oxide phase includes a p-block element chosen from lead, tin, bismuth, antimony, and tellurium.

16. The coated component of claim 1, wherein the coated component is chosen from a fluid passage, a fuel nozzle, a valve orifice, a vane, a pilot orifice, a main orifice, a valve, a swirler, a venturi, a heat exchanger, and a lube oil system component.

17. The coated component of claim 1, wherein the substantially pure transition metal oxide phase is in contact with a surface portion of the substantially pure transition metal phase, the substantially pure transition metal oxide phase is in contact with a portion of the substantially pure transition metal phase that extends past a surface portion of the substantially pure transition metal phase into a bulk portion of the substantially pure transition metal phase, or both.

18. The coated component of claim 1, wherein the metal substrate is chosen from iron-based alloys, nickel-based alloys, cobalt-based alloys, alloys containing cobalt and chromium, alloys containing platinum and aluminum, alloys containing nickel and aluminum, and alloys containing nickel, chromium, aluminum, and yttrium.

19. A method of making the coated component of claim 1, the method comprising:

co-depositing a transition metal and a noble metal on the metal substrate to generate a coated substrate, wherein the transition metal and the noble metal are substantially immiscible; and oxidizing a portion of the transition metal to generate the coated component.

20. The method of claim 19, wherein the co-depositing is an electrodeposition from a solution including the transition metal as dissolved ions and the noble metal as dissolved ions.

* * * * *